United States Patent [19]

Anderson et al.

[11] Patent Number: 4,676,664
[45] Date of Patent: Jun. 30, 1987

[54] EXPLORING FOR SUBSURFACE HYDROCARBONS BY SEA FLOOR TEMPERATURE GRADIENTS PREFERABLY USING A MULTIPLEXED THERMISTOR PROBE

[75] Inventors: Roger N. Anderson, New York; Michael A. Hobart, Palisades, both of N.Y.; William Van Steveninck, Midland Park, N.J.

[73] Assignee: The Trustees of Columbia University in the City of New York, New York, N.Y.

[21] Appl. No.: 514,303

[22] Filed: Jul. 15, 1983

[51] Int. Cl.⁴ .................... E21B 49/00; E21B 47/00
[52] U.S. Cl. ...................... 374/136; 73/154; 374/169
[58] Field of Search ............ 374/136, 183, 169; 73/154, 170 A, 432 R; 436/29; 175/50

[56] References Cited

U.S. PATENT DOCUMENTS

| | | | |
|---|---|---|---|
| 3,181,629 | 5/1965 | Birman | 374/136 |
| 3,217,550 | 11/1965 | Birman | 73/154 |
| 3,808,889 | 5/1974 | Rowson | 374/136 |
| 3,934,476 | 1/1976 | Lamb | 374/183 |
| 4,003,250 | 1/1977 | Poppendick | 73/154 |
| 4,092,863 | 6/1978 | Turner | 374/169 |
| 4,120,199 | 10/1978 | Mufti | 73/154 |
| 4,445,788 | 4/1982 | Twersky | 374/136 |

FOREIGN PATENT DOCUMENTS 940114  6/1982  U.S.S.R. ................... 374/136

OTHER PUBLICATIONS

Physics; Hausmann; pp. 508 and 509; Sep. 1935.

Primary Examiner—Charles Frankfort
Assistant Examiner—Denis E. Corr
Attorney, Agent, or Firm—John P. White

[57] ABSTRACT

Disclosed are a method and a system for measuring the sea floor temperature gradient several meters into the formation at each of an array of measurement sites, and using these gradients to explore for and characterize hydrocarbon deposits. The measurements can be taken with a special lance driven into the otherwise undisturbed sea floor.

19 Claims, 23 Drawing Figures

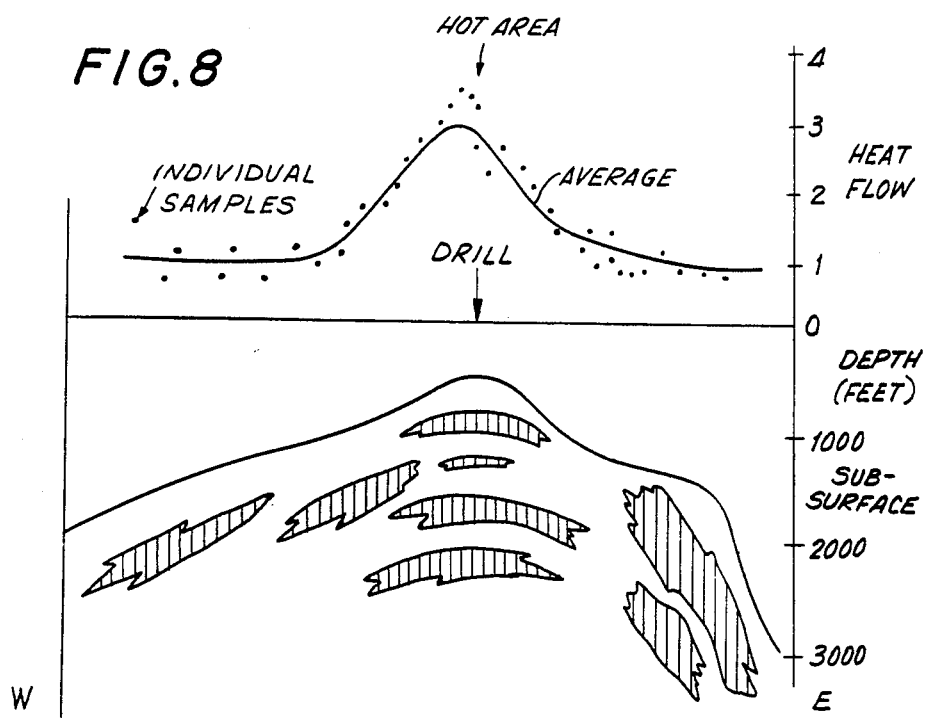
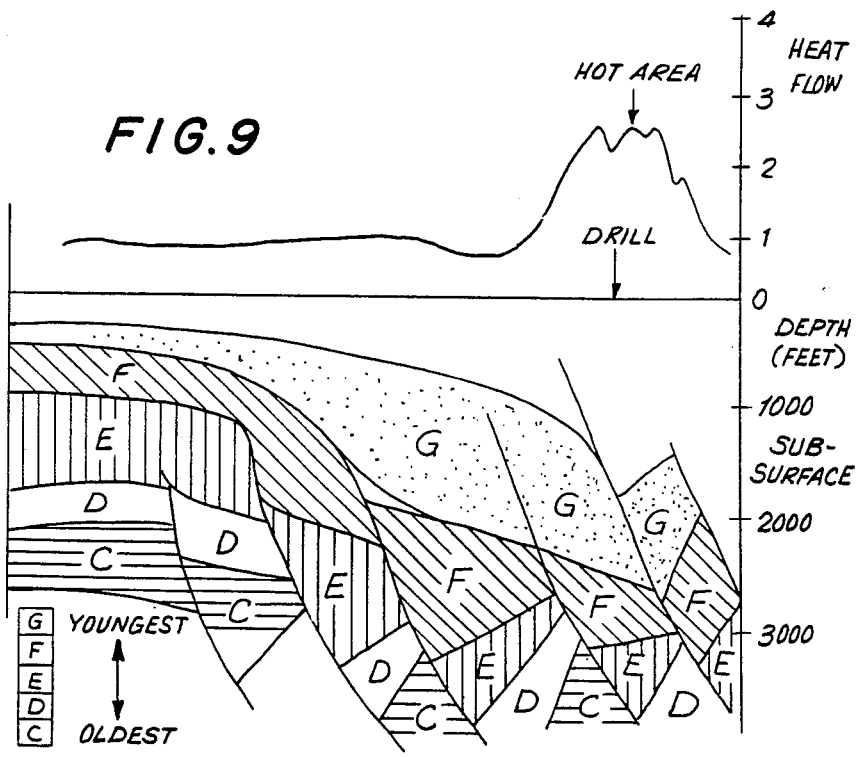

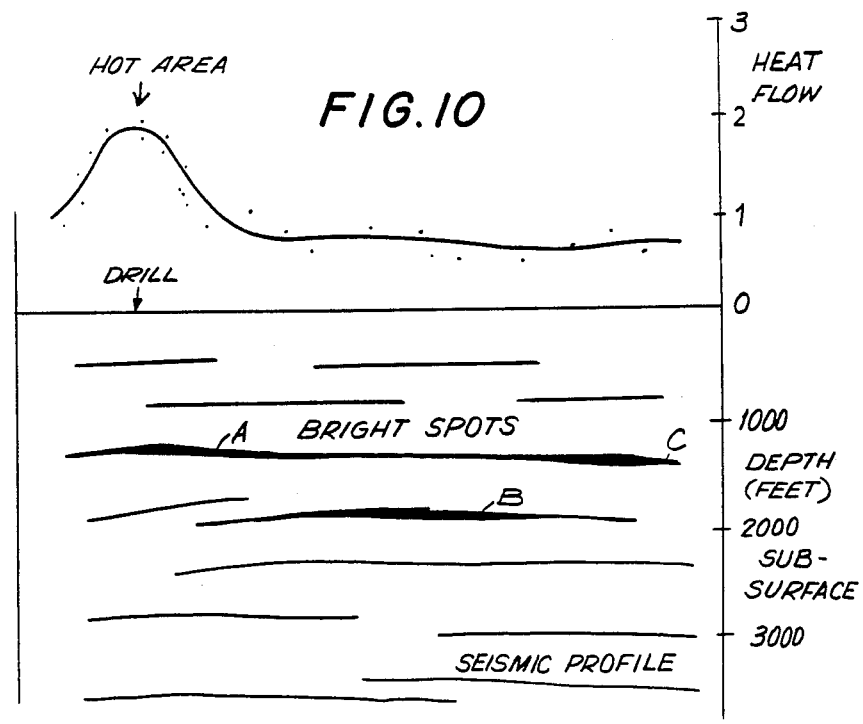
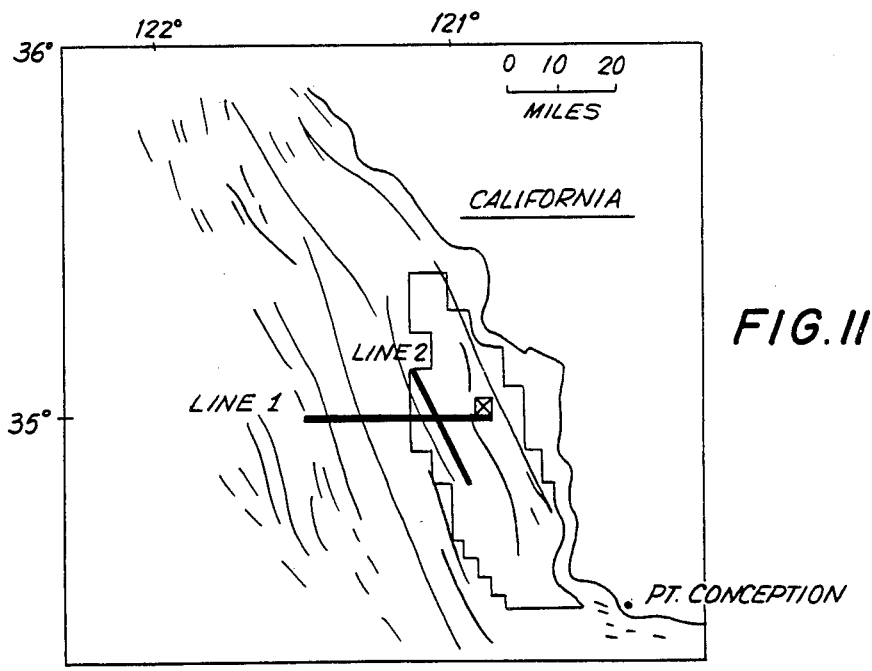

| FIG. 19a | FIG. 19b |

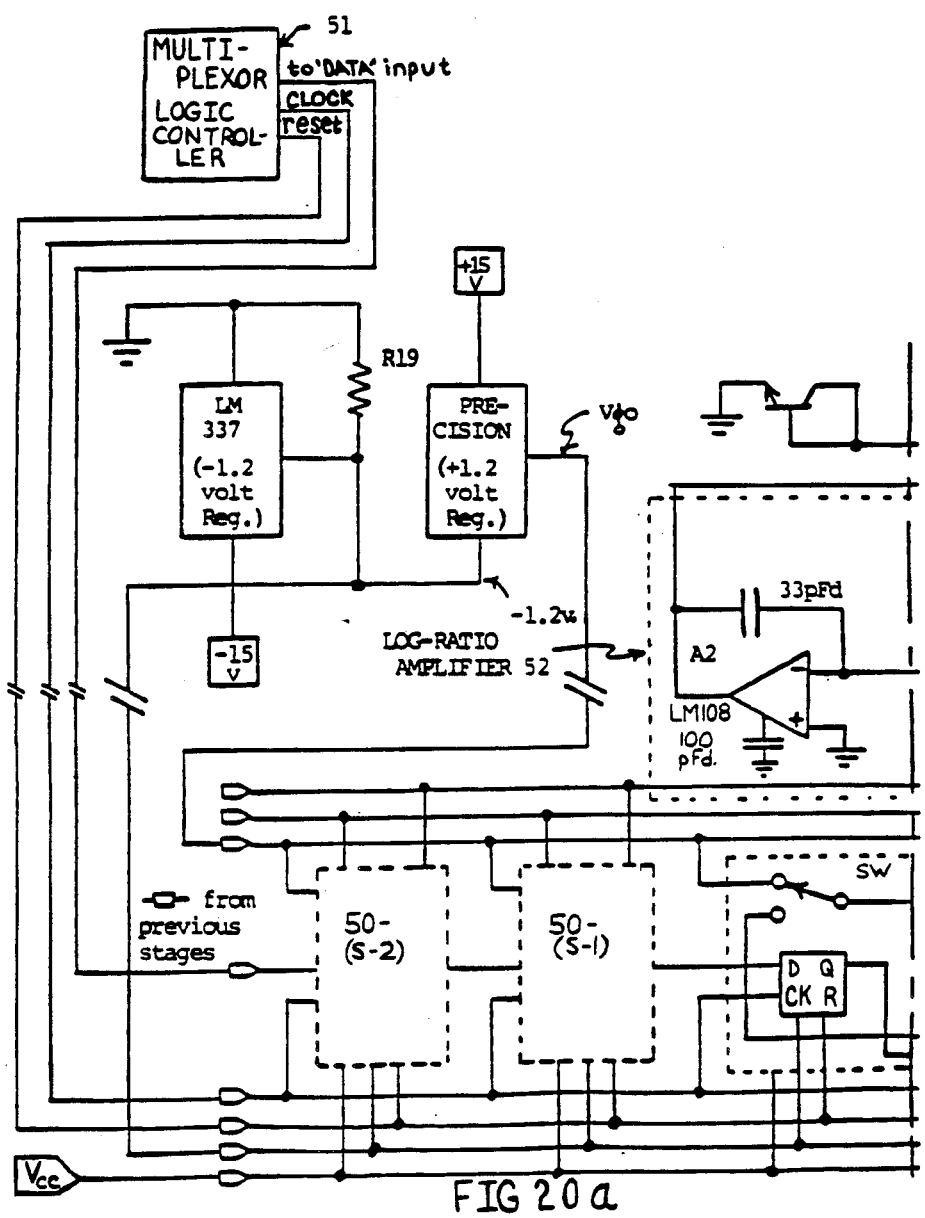

EXPLORING FOR SUBSURFACE HYDROCARBONS BY SEA FLOOR TEMPERATURE GRADIENTS PREFERABLY USING A MULTIPLEXED THERMISTOR PROBE

BACKGROUND AND SUMMARY OF THE INVENTION

The invention is in the field of using temperature measurements to explore for and characterize hydrocarbon deposits and particularly relates to using temperature measurements taken to a depth of only a few meters at sites arrayed on the floor of a body of water.

It has been known that some oil and gas fields are hotter at the pay depths than the surrounding rocks, as discussed for example in Meyer, H. J. et al., The Relationship of Geothermal Anomalies To Oil And Gas Accumulation In The Rocky Mountain Area, Am. Assn. Petl. Geol. Bulletin, 1983. Meyer et al. report a study of 22 oil and gas fields from six states in the Rocky Mountain region, and conclude that at least 15 of them have positive geothermal anomalies at the pay level, on the basis of drill-stem tests except for a few values from temperature logs and shut-in bottom hole measurements. As to causes of these temperature anomalies, Meyer et al. conclude that upward fluid movement at depth was the most important factor. Similarly, Mufti U.S. Pat. No. 4,120,199 proposes taking thermal gradient measurements in a borehole which does not penetrate a hydrocarbon deposit, and using them as an indication of the proximity of hydrocarbon deposits. The patent suggests that it may be practical in some cases to drill a number of shallow test holes in an area to be explored simply for the purpose of mapping temperature gradients from measurements taken in the 50 to 100 foot depth region, and that even shallower boreholes can be used when a set of readings can be made in such a short time period that seasonal changes can be ignored.

In addition, deep sea floor heat flow measurements have been made using a lance penetrating the sea floor up to a depth of several meters and carrying a few (e.g., six) temperature measuring devices spaced from each other along the lance length. However, it is believed that the temperature gradient measured in shallow water with such a lance cannot be corrected satisfactorily for influences which conceal or obscure the information of interest; it has been discovered as a part of making this invention that at least at water depths of less than a few hundred meters many more temperature measurements per unit length of the lance are needed in order to unscramble the information of interest with sufficient accuracy and reliability.

In view of the known prior art identified above, it is believed that a need exists to find a way to take temperature gradient measurements which do not require the expense of pre-drilling boreholes but which nevertheless contain extractable information which reliably signifies the convection of nearby hydrocarbons, and to process these measurements into useful information on the presence and nature of subsurface hydrocarbons. Important aspects of the invention are directed to meeting that need.

In an exemplary and a nonlimiting embodiment of the invention, a promising subsurface area is selected on the basis of knowledge of its geology from studies such as seismic surveys or from other sources, and suitable information is found as to the surface thermal conductivity of the sea floor material and the long term (e.g., seasonal) bottom water temperature variations. The thermal conductivity of interest can be measured by taking core samples and finding the thermal conductivity by conventional needle probe measurements. Alternately, it can be estimated from otherwise available information on the subsurface lithology. The long term bottom water temperature variations can be measured e.g. with a temperature probe left at the sea bottom in the area of interest and arranged to record the bottom water temperature frequently enough (e.g. hourly, daily or weekly) over a long enough period (e.g. at least three to six months and preferably a year). In the alternative, the seasonal bottom water temperatures can be deduced from sea bottom temperature gradients as discussed below.

An array of measurement sites is selected, preferably on the basis of some knowledge of the subsurface geology, such that there would be no undue repetition of temperature gradients from site to site but, on the other hand, the sites will be close enough to avoid abrupt changes in temperature gradients as between adjacent sites. For example, if the area of interest includes a fault, the sites can be in a line perpendicular to the fault plane and can be more closely spaced at the fault (25–100 meters) and less closely spaced elsewhere (at 1 km intervals). If the subsurface formation includes a symmetrical salt dome, the measurement sites can be on a cross or a regular grid and closely spaced at the dome edges (25–100 m) and less closely spaced away from the dome edges (0.5 km). A special lance, capable of penetrating the sea floor at the area of interest and having a string of closely spaced temperature measuring devices (e.g. 25–100 per meter) along its length, is delivered to a selected measurement site suspended on a hoisting cable, and is driven into the sea floor. As an alternative, a free-falling special lance package can be thrown over the side of a ship. It will sink to the bottom and drive the lance into the mud. After the requisite temperature measurements are made, an acquatic release can be triggered, returning the temperature recording package back to the surface on buoyant spheres, and leaving the replaceable lance shell in the mud. A record is made of a time sequence of temperature measurements taken by each temperature measuring device, and selected ones of these measurements are telemetered acoustically to a surface vessel, where they are used to check factors such as whether the lance was driven deep enough or straight enough, whether the telemetered measurements indicate suspicious or invalid data, whether the initial choice of intervals between measurement sites needs to be revised and, if so, by how much. After enough measurements have been taken to allow a correction to be made in accordance with the invention for transient effects such as heat build-up due to the friction in driving in the lance, while typically takes 5–20 minutes depending on the type of lance and the formation, the lance is moved to the next selected site, and the procedure is repeated until all sites have been serviced.

The lance is then retrieved, and the recorded temperature measurements are processed to find, for each depth at each site, an equilibrium temperature approaching the temperature which the measuring device would have recorded had it been left in place for a long time in a formation at the same temperature. Because the temperature measurement devices are so closely spaced, the record of equilibrium temperatures versus depth at a given site can be considered for practical purposes a nearly continuous temperature gradient.

It has been found important for this invention to account for the heat propagating down into the sea floor due to long term (seasonal) bottom water temperature variations. To this end, the effect of these variations is projected downwardly to find what part of the equilibrium temperature measured at a given depth for a given measurement site is due to those long term bottom water temperature variations.

If the temperature gradient for a given site, after having been corrected for the effect of these long term bottom water temperature variations, is substantially linear with depth, this is used as an indication that heat propagates through the surface formation only or mostly by conduction, and heat flow at the site can be found as a product of the so corrected temperature gradient and the thermal conductivity of the formation (which has been measured from core samples or is otherwise known). If the corrected temperature gradient is not a linear function of depth and is a curve which is substantially on one side of a straight line, this is used as an indication that there is significant advection (vertical flow of fluids through the formation at the site), and the heat flow at the site can be found as a function of the fluid velocity through the formation, the formation density, the heat capacity of the saturated medium, the top and the bottom temperatures measured at the site and the Peclet number.

The so-determined heat flow at the respective sites can be plotted to produce a heat flow map which, in accordance with the invention, can indicate the location of nearby subsurface hydrocarbon deposits. In addition, the otherwise available geological information can be used to construct a geological model of the formation below the sea floor, and this model can be compared with the map of the heat flow at the sea floor and modified until a satisfactory fit is observed between the model and the heat flow map. The sea floor temperatures can then be projected downwardly into the modelled formation, with corrections for factors such as conductivity variations with depth, sedimentation or erosion at the sea floor and migration of the hydrocarbon, to determine if the indicated hydrocarbons have matured at the right temperature for long enough to be commercially useful. Other corrections, such as for thermal refraction and the sea floor topography, can also be used in accordance with the invention.

A significant aspect of the invention is the recognition that temperature measurements taken over a depth of only a few meters by a driven-in lance rather than in a predrilled deep borehole, if taken in the indicated manner can be used in accordance with the invention to unscramble the signal of interest—sea floor heat flow due to migration of hydrocarbons in the recent geological past—from disturbing influences which can be much greater in magnitude. Another important aspect is the realization that surface heat flow measurements, whether taken at the sea bottom or on dry land, can be projected downwardly, with accounting for the relevant disturbing influences, so as to estimate the temperature and the time at which hydrocarbon deposits have evolved, so as to find whether the temperature history of such evolution suggests commercially useful hydrocarbon deposits. Other important aspects of the invention will become apparent from the detailed description below.

BRIEF DESCRIPTION OF THE DRAWINGS

FIG. 8 shows a vertical section through another hypothetical formation (subsurface reef deposit), and a surface heat flow curve therefor; the potential drilling targets (hatched), determined from seismic survey, have unknown permeability; those reef structures which are hot indicate convection which in turn indicates high permeability and are primary choices for wildcat drilling.

FIG. 9 shows a vertical section through another hypothetical formation (growth faults), and a surface heat flow curve therefor; the high surface heat flow area would be a preferential drill site over the areas with low heat flow.

FIG. 10 shows a vertical section through another hypothetical formation, and a surface heat flow curve therefor; the high heat flow bright spots (located from seismic profiling) indicate the presence of a permeable reservoir and convection occurring in that reservoir.

FIG. 11 shows an offshore basin, such as the Santa Maria Basin off California, which has never been drilled, but can be evaluated for hydrocarbon potential through a surface heat flow survey; a pair of lines of measurement sites criss-crossing the basin can tell if it is hot; the younger a basin is, the hotter it has to be to have properly cooked (matured) hydrocarbons; this can be done before lease sale to locate best block to bid on.

FIGS. 20a, 20b and 20c, which fit together as shown in FIG. 20, illustrate a multiplexed temperature measuring circuit employing certain aspects of the invention.

DETAILED DESCRIPTION

The invention is consistent with a belief that significant convection within hydrocarbon reservoirs has occurred in many areas of the world in relatively recent geological times, and that the upward heat transfer toward the surface (e.g., the sea floor) due to such convection is so significant that it can be differentiated from the numerous other factors which influence the temperature of the top few meters. It is believed that because of higher thermal expansion coefficient and kinematic viscosity, and because of lower density, heat capacity and thermal conductivity, hydrocarbons dissolved in water or moving as a separate phase convect about two times more heat than water alone while migrating to a trap associated with structures such as salt domes, faults, reefs, and certain stratigraphic traps. Moreover, it is believed that if the hydrocarbon convection is occurring now or has occurred in the recent geological past, a large anomology in the flow of heat out of the sea floor can result. Such heat flow anomolies would be superimposed on a broad conductive heat flow normally associated with, for example, salt domes or recent volcanic intrusions because of the high thermal conductivity contrast between materials such as, on the one hand, salt and volcanic rock and, on the other, sedimentary rock.

Figure 1:
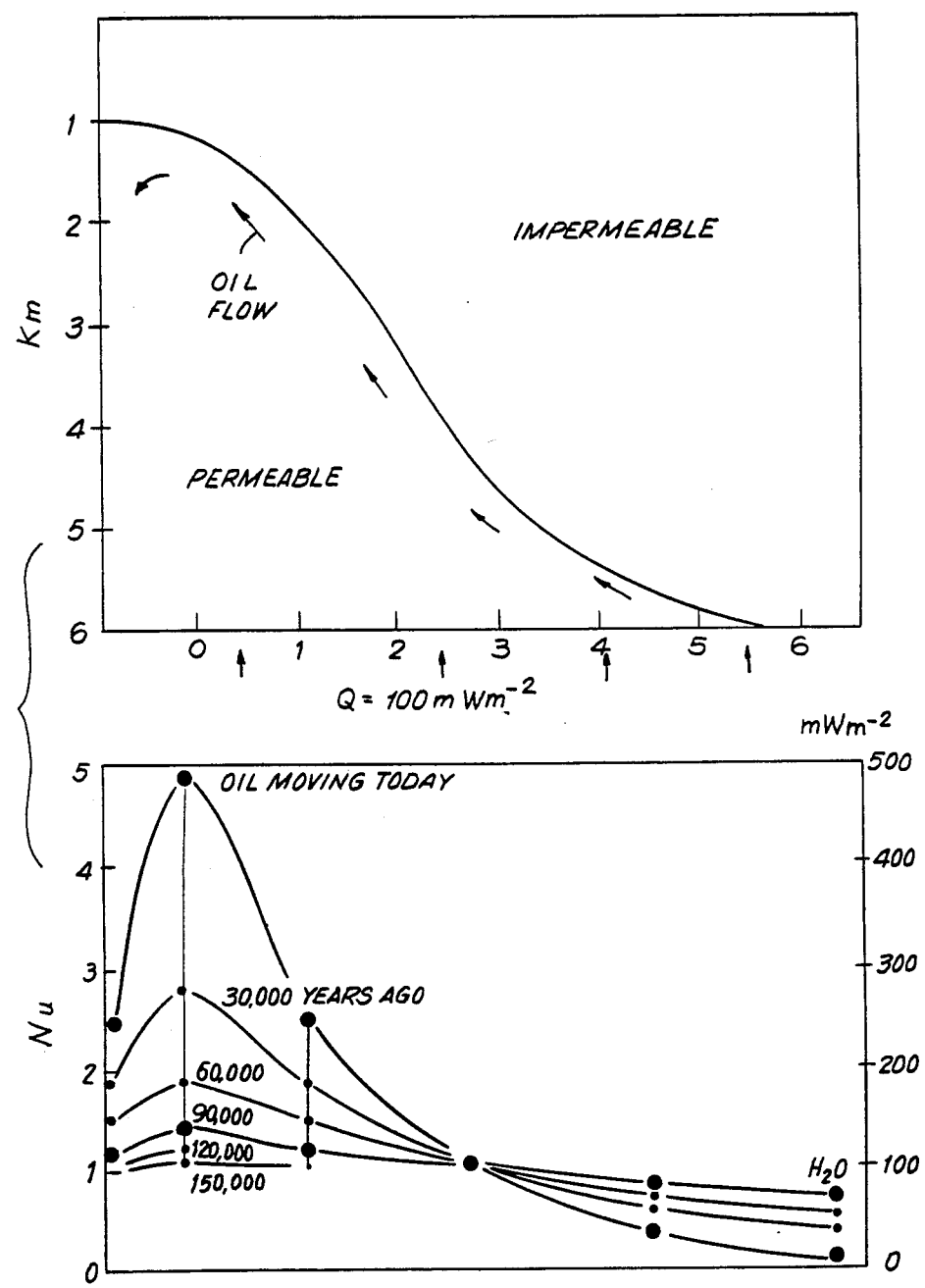
FIG. 1 illustrates a vertical section through a hypothetical subsurface formation (anticline) and a set of heat flow curves therefor modelled for convection of oil that stopped at different times in the geological past; Nu is the ratio of the surface heat flow to the equilibrium heat flow if convection had never taken place.

It is further believed that high heat flow areas discoverable in accordance with the invention should remain for a significant amount of geological time after convection of subsurface hydrocarbons has stopped. For example, finite element modeling of the convection of oil in a two layered porous medium in a structure of the type illustrated in FIG. 1, should show surface heat flow of the kind illustrated in the same Figure, where the steepest curve is for heat flow related to convection of oil which is occurring now and the other curves relate to heat flow after convection of oil has stopped the indicated number of years ago.

EXAMPLE 1

Figure 3:
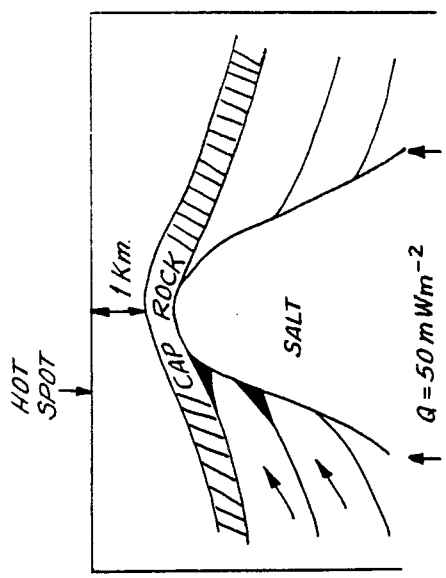
FIG. 3 is a vertical section taken along line 3—3' in FIG. 2; Q is heat flow from below salt dome.
Figure 5:
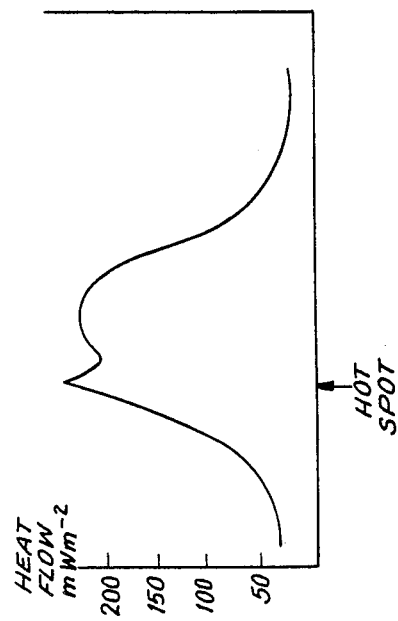
FIG. 5 is a heat flow curve measured at the surface of the section shown in FIG. 3 along line 3—3' of FIG. 2.
Figure 2:
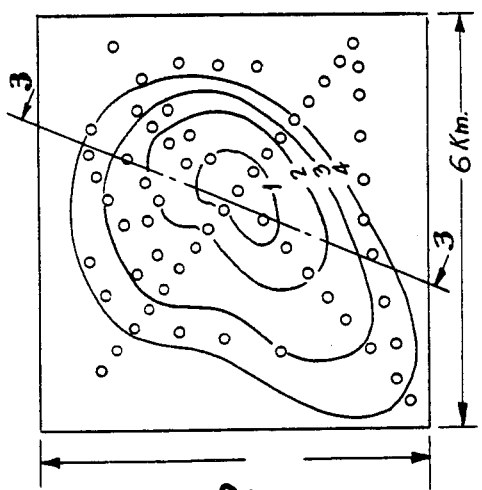
FIG. 2 is a contour map of a sea floor area looking down on a hypothetical salt dome; the depth from the sea floor to the cap rock is given in km, and the small circles denote temperature measurement sites.
Figure 4:
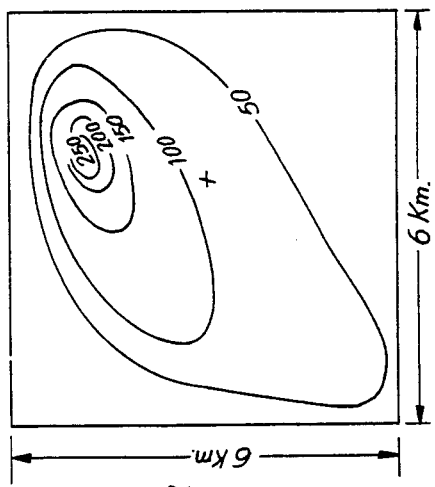
FIG. 4 is a contour map of heat flow measured at the sea floor above the salt dome shown in FIG. 2 (open circled, then contoured every 50 $mWm^{-2}$ interval).

As a nonlimiting illustration of a setting in which an embodiment of the invention can be used, consider a hypothetical salt dome off the Gulf Coast of the United States. FIG. 2 is a contour map of the salt dome and its vicinity, looking downward; the numbers of the closed curves show the depth level isovalues of the impermeable cap rock over the dome. FIG. 3 is a cross-section taken at line 3—3 in FIG. 2. Diapiricism of salt is still continuing, and associated with the salt's push upward, toward the surface, is the upward migration or convection of hydrocarbons along permeable rock adjacent the salt (at the lefthand side in FIG. 3). A trap for these hydrocarbons is formed between the salt dome and the cap rock in the northeast octant (FIG. 2) of the structure. Temperature gradient measurements, made in accordance with the invention at the sites indicated by small circles in FIG. 2, can be used to build up a contour map such as in FIG. 4, of the heat flow in milliwatts per meter squared ($mWm^{-2}$). The numbers in FIG. 4 on the closed, isovalue curves are in those units of $mWm^{-2}$. FIG. 4 matches FIG. 2 in orientation and covered area, and the cross in FIG. 4 matches the center of the salt dome. FIG. 5 shows the heat flow along the section shown in FIG. 3. FIGS. 2-5 suggest that the hottest area, surrounded by the smallest closed curve connecting heat flow isovalues at 250 $mWm^{-2}$, is the prime location for drilling a wildcat well, preferably if sufficient promising structure also exists on seismic profiles or is known from other sources.

EXAMPLE 2

Figure 6:
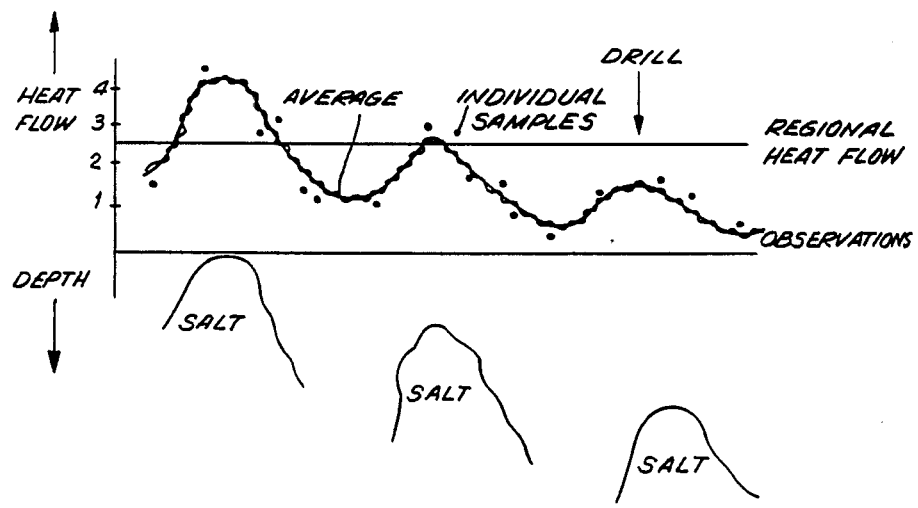
FIG. 6 shows a vertical section through a hypothetical subsurface formation (successively deeper salt domes) and a heat flow curve (times $10^{-6}$ cal. $cm^{-2}$ sec.$^{-1}$) therefor; the hottest dome has sour gas; use heat flow to determine which other dome to drill.

As another nonlimiting illustration, consider the hypothetical structure illustrated at FIG. 6, which shows a vertical section through a field of salt domes on land. Assume that the dome closest to the surface is drilled, and yields sour gas—an indication that the hydrocarbons were kept too hot for too long to evolve into commercially desirable deposits. The two deeper salt domes are now considered for drilling. The selection of whether to drill the dome at the intermediate depth or the deepest dome can be made in accordance with the invention with the help of a surface heat flow survey similar to that discussed earlier in connection with a sea floor heat flow map. If either the intermediate or the deepest salt dome is found to be considerably colder than the shallow dome (by projecting the surface heat flow findings downwardly in accordance with the invention), the colder one should be the more promising drilling site, because its temperature history is more likely to have allowed the proper evolution of commercially desirable hydrocarbons. Thus, in this example the invention is used to reduce wildcat drilling costs by drilling away from rather than near the hottest region determined by surface measurements.

EXAMPLE 3

Figure 7:
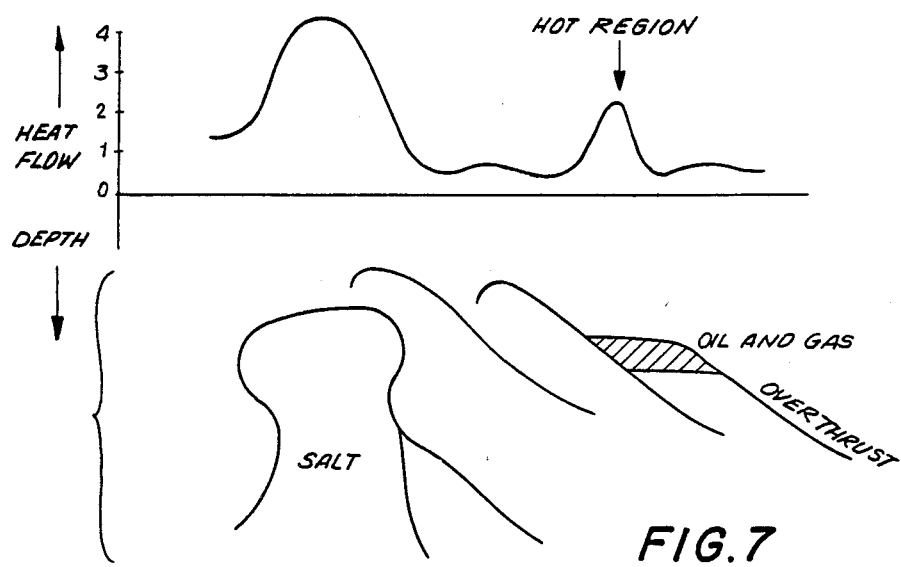
FIG. 7 shows a vertical section through another hypothetical subsurface formation (shale overthrusts on the edge of a salt dome) and a surface heat flow curve therefor.

As another nonlimiting illustration, consider the hypothetical structure illustrated in FIG. 7, which is a vertical section offshore showing a diapiric structure of unknown composition with several overthrust sheets covering it, also of unknown structure. All of the illustrated subsurface structures appear to be promising trap-like petroleum prospects. Suppose that surface heat flow measurements, as described in connection with the invention, are taken and produce the illustrated curve. The heat flow curve indicates that the diapir is a hot region (salt) but that the overthrusts are generally cold, thus suggesting shale overthrusts. However, on the shallow edge of one of the overthrusts, a hot region is indicated, which should be the most promising drilling site, showing the signature of hydrocarbon migration toward a trap.

EXAMPLE 4

As yet another nonlimiting illustration, consider FIG. 8 which shows a hypothetical structure comprising an anticlinal reefy structure in which the hydrocarbon horizons are believed (from other information) to be in the porous reef and grainstone facies at the eastern margin of the structure. No wildcat drilling has yet been done, and no bidding price has yet been decided on for an upcoming lease sale of the block containing this structure. A significant concern is that even though the reefy deposits are porous, they may have low permeability. If so, though hydrocarbons may be present in commercially important quantities, they would prove unprofitable because they would not flow easily enough. Suppose that a surface heat flow map produced in accordance with the invention shows the illustrated profile at the section of interest. The otherwise most promising eastern flank of the structure shows heat flow that is generally uniform and unspectacular, thus indicating that no significant convection of hydrocarbons has occurred in the recent geological past. However, a much hotter area peaks over the central structural high, thus indicating convection of hydrocarbons and hence permeability of the formation. The most promising drilling site would be as indicated, in the central area of the structure. Therefore, a substantial amount can be committed to a bid to purchase this block at the next sale, and a substantial savings would be realized by not bidding on the promising structure to the east.

EXAMPLE 5

As yet another example, consider FIG. 9 which shows a vertical subsurface section through a hypothetical field dominated by growth faults. In fact, there are so many promising hydrocarbon prospects that it is difficult to decide where to drill first. Suppose a heat flow map produced in accordance with the invention shows surface heat flow variation across the section having the indicated shape, with a peak along the boundary of the growth fault to the east but with no heat flow anomaly to the west. The most promising drilling site is therefore under this hot area. Fluid migrating along the growth fault of interest can be detected in accordance with the invention by observing a nonlinear thermal gradient at the surface (caused by the surficial advection of fluids), as opposed to the normal case of linear thermal gradients caused by conductive heat flow alone. In this case the extra heat carried by the advecting fluids causes localized ripples superimposed over the broader scale high heat flow anomaly coming from depth.

EXAMPLE 6

As yet another example, consider FIG. 10 which shows a vertical section through a hypothetical structure comprising flat strata. The section would be unremarkable except for three "bright spot" horizons. In this context, "bright spots" are unusually high amplitude reflections off gas-bearing formations in a seismic survey, and typically are used as direct indications of gas deposits. However, less than half of the drilled "bright spots" have commercial gas plays within them. In accordance with the invention, the most promising "bright spots" can be found by a surface heat flow map produced in accordance with the invention. The "bright spot" which coincides with a high heat flow anomaly at the surface would be the best choice for first priority drilling. In FIG. 10 this is bright spot A.

EXAMPLE 7

As yet another nonlimiting illustration, consider an upcoming lease sale over several blocks, each with promising stratigraphic traps in the subsurface formations. A heat flow surface profile across the general trend of the structure beneath the blocks, produced in accordance with the invention, can be used as an indication of which blocks should be purchased (those with highest heat flow anomalies). Note that the heat flow profile may need only be in one direction, or two dimensions, rather than three dimensional.

EXAMPLE 8

As a last illustration, consider a basin in which no drilling of any kind has ever been done, and in which one of the factors of interest is the thermal history of possible hydrocarbon deposits through geological times. In particular, suppose it is desirable to know if suitable "cooking" of hydrocarbons has occurred within the source beds in the basin. A surface heat flow map taken at measurement sites in a single line across the structural dimension of the beds can give the heat flow rate at the surface, which can be assumed to be the same depth as at depth at the source beds. The temperature of the source beds at this time is then calculated by estimating the thermal conductivity of the rock between the surface and the source beds. The temperature is calculated as the heat flow divided by the average thermal conductivity times the depth of the source beds. Maturation analysis requires the past thermal history of the source beds; and the present day temperatures from which such an analysis can begin, is provided in accordance with this invention.

To illustrate, consider the Santa Maria Basin off the coast of California. Substantial new deposits of oil and gas were recently discovered there. A heat flow survey in accordance with the invention along lines 1 and 2 in FIG. 11 would have shown that the entire basin is a substantially uniformly high heat flow area. This information, combined with the knowledge that this is a young geological basin, should have led to the conclusion that the basin has mature (and hence commercially useful) hydrocarbons even before any drilling occurred because it is unusually hot as compared to other basins of the same geological age which do not contain mature hydrocarbons.

An Exemplary Process

Figure 12:
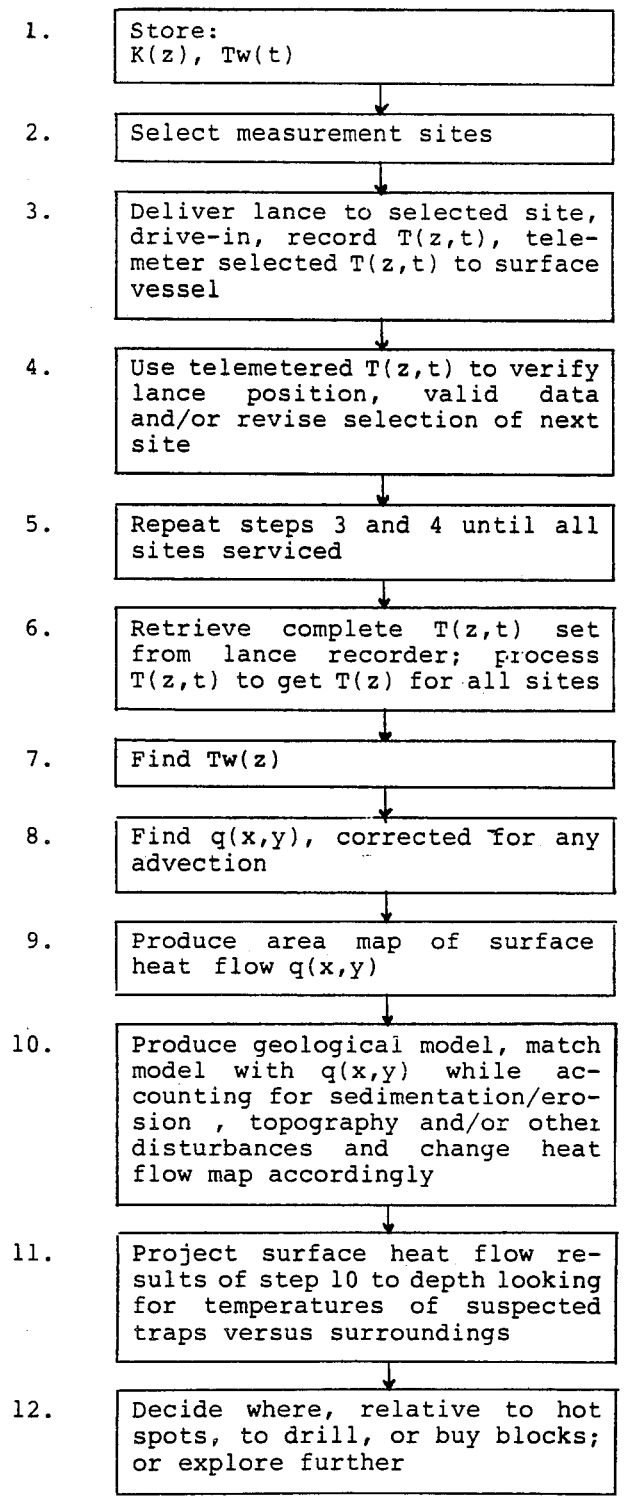
FIG. 12 is a flow chart of a process embodying the invention; $K(z)$ is the sedimentary thermal conductivity (K) function versus depth (z); $Tw(t)$ is bottom water temperature (Tw) versus time (t); $T(z,t)$ is temperature (T) at depth z at each time interval t; $T(z)$ is thermal gradient with depth; $q(x,y)$ is heat flow map at the sea floor.

Referring to FIG. 12 for an illustration of the major steps in carrying out an exemplary process embodying the invention, as applied in sea floor (or other water body) environments, a first step is to find two parameters of interest: $K(z)$, which is the thermal conductivity $K$ at depth $z$ at the measurement site area (in this case $z$ is along the length of the lance), and a parameter $Tw(t)$, which is the water temperature $Tw$ at time $t$ at the sea bottom area of interest, taken at sufficiently frequent intervals (e.g. hourly, daily or weekly) for a sufficiently long period of time (e.g. at least 3–6 months). The parameter $K(z)$ can be found, e.g., by taking core samples from the sea bottom area of interest and subjecting them to conventional needle probe thermal conductivity measurements. If the sea floor material is known to be substantially uniform over the area of interest, then a single core sample can suffice. Otherwise, a sufficient number of core samples should be taken to be representative of the different materials along the area of interest. If thermal conductivity does not change with depth over the first several meters into the sea floor, then this parameter is a constant. The parameter Tw(t) can be measured with a temperature probe coupled with a recorder programmed in the required manner and left on the sea floor, at the area of interest, over the requisite time period. In the alternative, this parameter can be deduced from the temperature gradients as discussed below.

The second step in the exemplary process is to select measurement sites in a pattern suitable to the subsurface structure of interest, assuming that there is some knowledge of the subsurface structure from sources such as seismic or other surveys. The criteria for site selection include the desirability that sites be sufficiently far from each other—so that there is no undue duplication of measurements, but sufficiently close to each other—so that there are no abrupt temperature gradient changes as between adjacent measurement sites. For example, if the subsurface structure includes a planar fault, the measurement sites can be in a line perpendicular to the fault and can be closely spaced (e.g., at 25-100 m) near the fault but spaced further apart elsewhere (e.g., at 1 km). If the subsurface structure includes a salt dome of e.g. about 2 km diameter, the measurement sites can be in a grid pattern, closely spaced from each other around the dome edges (e.g., at 25-100 m) but at greater spacing (e.g., 0.5 km) away from the dome edges.

The third major step comprises delivering a lance to the first selected site, driving it into the sea floor to the required depth, and recording a succession of measurements T(z,t), where each is a measurement of the temperature T at depth z measured at time t, and telemetering at least selected measurements T(z,t) to a surface vessel.

At step 4 the temperature-versus-time measurements acoustically telemetered from the lance are received at the surface vessel, where they are converted to electrical signals and are preliminarily processed by computer to verify parameters such as the lance position, whether valid data has been taken and transmitted up to the surface vessel, etc. The results give a preliminary heat flow value which can be used to revise the selection of the next measurement site, or the overall selection of measurement sites.

Figure 13:
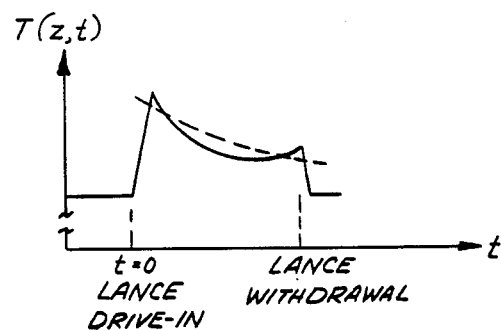
FIG. 13 shows an example of $T(z,t)$ measured in sediment by one temperature sensing device showing frictional heating; dashed line is exponential fit to infinity for cooling of a cylinder.

For an illustration of the type of temperature measurements telemetered to the surface vessel for the output of one temperature measuring device (at depth z) from one measurement site, refer to FIG. 13, where the vertical axis is the magnitude of the temperature measured with the particular device at the particular depth and the horizontal axis is time. From the origin up to the time t=0, at which the lance is driven in at the selected measurement site, the temperature of the particular measurement device which is at point z along the lance is substantially stable and corresponds to the bottom water temperature. At time t=0, the lance is driven into the mud and its temperature rises rapidly, partly because of transient factors such as the frictional heat from driving in the lance, and partly because of the higher subsurface temperature. The temperature then keeps dropping as the transient effects dissipate, and moves toward an equilibrium. The lance is then withdrawn, and some transient effects such as frictional heat again change the temperature.

In accordance with the invention it is desirable to find the temperature T(z,t) when time approaches infinity, i.e. to approximate the equilibrium temperature, and this is done by fitting the actual measurement to an exponential curve of the indicated type. Note that in FIG. 13 a continuous temperature curve is shown but in fact both the recorded and the telemetered temperature measurements are at discrete points in time and are digitized (and recorded and transmitted as digitial values). The equilibrium temperature fr a given depth z can be found following Jaeger, J. C., Conduction of Heat in an Infinite Region Bounded Internally by a Circular Cylinder of a Perfect Conductor, Australian J. Physics, 9, 167-179, 1956, using the solution for a thin cylinder to extrapolate the temperature at which the temperature measuring device would settle if it had been left at the same place for a long time under the same conditions.

Figure 14:
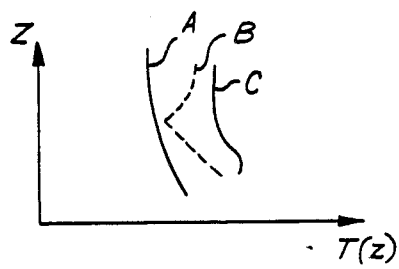
FIG. 14 shows examples of: (A) typical temperature versus depth profile; (B) profile indicating insufficient lance penetration into the sea floor; and (C) an erratic profile indicative of thermal leakage at the lance or an electronic failure.

The preliminary processing of the telemetered data at the surface vessel can involve displaying at least selected curves such as the temperature-vs.-time curve illustrated in FIG. 13, and/or a curve, such as illustrated at curve A in FIG. 14, of the calculated equilibrium temperatures T(z) versus depth for a particular site, to verify parameters such as (i) whether the lance has been driven in deep enough (the temperature measuring devices in the part of the lance above the sea bottom surface will indicate steady temperature equal to that of the bottom water, as in curve B in FIG. 14), (ii) whether invalid data has been received (the equilibrium temperature versus depth curve for a given site should be a smooth curve, and erratic changes, such as at curve C in FIG. 14, can indicate invalid data due to factors such as poor contact between the lance and the formation or improper operation of the electronics), and (iii) whether the site selection is consistent with the initial knowledge of the subsurface geology and lithology (e.g. if the equilibrium temperature versus depth curve for the current site is very different from that for the last site perhaps the next site should be intermediate between the last two, or if the two curves are nearly identical perhaps the next site should be further away from the current one, or if the current site gives erratic, possibly invalid data, a new site very close to it can be tried). In addition, the acoustic signals telemetered from the lance can be used to verify that the actual lance position is at the selected measurement site: by matching the acoustic signals from the lance with acoustic signals received from transmitters or transponders at known positions along the sea bottom, or by using an array of surface receivers and relying on known techniques for locating the position of sources of acoustic signals. In the alternative or in addition, the position of the lance can be deduced by monitoring the length and angle with respect to the horizon of the paid-out hoisting cable and solving the requisite solid geometry equations.

At step 5 of the exemplary process, the lance is hoisted up from the current site and moved to the next measurement site, determined either on the basis of the initial selection of sites or a selection revised in accordance with the results of step 4, and steps 3 and 4 are repeated, and the process runs through steps 3, 4 and 5 until all measurement sites are similarly serviced.

At step 6 the lance is hoisted up to the surface vessel, the recorded complete set of temperature measurements is retrieved, and the temperature-vs.-time measurements are processed by computer, in the manner discussed in connection with FIG. 13, to convert the time succession of sampled temperatures from each temperature detecting device to an equilibrium temperature for that device. The result of step 6 is that for each measurement site there is a respective temperature gradient T(z) made up of a succession of equilibrium temperatures, each for a respective depth into the formation (determined by the position of the respective temperature measuring device along the lance and knowledge of how deep the lance was driven in at that measurement site, as determined from information such as discussed in connection with curve B in FIG. 14). Because in accordance with the invention the temperature measuring devices are very closely spaced along the lance length, these gradients can be considered to be substantially continuous.

The equilibrium temperature found for a given depth z at a given measurement site is influenced, among other things, by heat propagating downwardly into the formation due to long term temperature changes of the fluid in thermal contact with the surface. In the case of sea bottom measurements, this means the long term (seasonal) temperature changes of the sea bottom water. It should be noted that the temperature changes in the first few meters of the subsurface formation which are due to this downwardly propagating heat flow can be many times the temperature changes due to the phenomenon of interest (upward migration or convection of hydrocarbons) and that this disturbing influence is more pronounced for shallow water environment, where the seasonal bottom water temperatures go through greater magnitude excursions. It is important therefore in accordance with the invention, to account for this downwardly propagating heat flow by finding what is its contribution to the equilibrium temperature measured at a particular depth for a particular measurement site.

On the assumption that this downward heat flow can be considered to approximate a sinusoidal wave, its influence can be resolved into a Fourier series and then substituted into a suitable temperature relationship following Carslaw and Jaeger, Conduction of Heat in Solids, Oxford University Press, 1959, pp. 64-70. In particular, the long term (seasonal) variation with time t of the sea bottom water temperature Tw, which is known from an actual long term sea bottom temperature measurement, as discussed above, can be designated Tw(t), and can be resolved into the following Fourier expression, which can then be substituted into the following expression for Tw(z), which is the contribution, due to the downwardly propagating heat flow, to the equilibrium temperature T(z) actually measured at depth z into the sea floor at the given site:

$$Tw(t) = A_o + A_1 \cos(wt - e_1) + A_2 \cos(2wt - e_2) + \ldots \quad (1)$$

$$Tw(z) = A_o + \sum_{n=1}^{\infty} A_n e^{-z\sqrt{(nw/2t)}} \cos\left[nwt - e_n - z\sqrt{(nw/2k)}\right] \quad (2)$$

In the above expressions, the coefficients A are the Fourier series coefficients found by fitting the Fourier expression to the long term temperature measurements Tw(t) actually made at the sea bottom area of the measurement sites, the parameter k is the thermal difusivity of the subsurface formation into which the lance is driven and is derived by dividing the thermal conductivity of the formation K (known from sources such as core sample needle probe measurements) by the product of the formation density $\rho$ and formation heat capacity c (also known from conventional measurements of the core samples or other sources), the parameter $\tau_n$ is the phase shift of the component waves, (n). The components Tn(z) decrease in amplitude with depth as indicated in the expression below, and there is a phase shift $\phi_n$, also indicated by the expression below:

$$Tn(z) = A_n e^{-z\sqrt{nw/2k}} \quad (3)$$

$$\phi_n = z\sqrt{nw/2k} \quad (4)$$

These relationships can be used to find the expected temperature as a function of depth from a given time series. A successful correction should leave as a result only or substantially the geothermal gradient:

$$Tg(z) = T(z) - Tw(z) \quad (5)$$

It has been found as a part of the invention that the larger the number of temperature measurements per unit length of lance, and the deeper the lance extends into the subsurface formation, the more accurately these corrections can be made. It is believed that a minimum of 10-15 temperature devices per meter are desirable for this purpose, and that 25-100 per meter, or even more, is preferable. In particular, this permits acceptable checking of the adequacy of the time series used for the parameters above. Various techniques can be used to test the relevant correlation, including tests based on phase coherence, of the type proposed by Martinson, D. G., et al., An Inverse Approach To Signal Correlation, J. Geophysical Res., 87, 4807-4818, 1982.

After step 7 finds the contribution Tw(z), which the downwardly propagating heat flow makes to the equilibrium temperature T(z) measured at a given depth for a given measurement site, the exemplary process goes on to step 8 to find if there is significant advection (vertical flow of fluids through the formation), and if so to account for its influence, and to find the geothermal heat flow Q for each position (x,y) of a measurement site.

Figure 15:
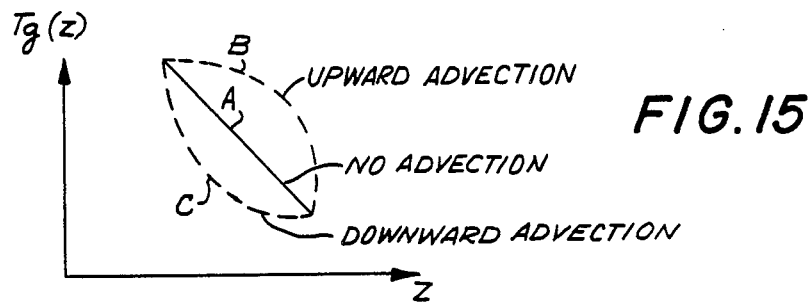
FIG. 15 shows a thermal gradient shape in the case of convection of water throuh surficial sediments; correct heat flow can be determined by correcting the thermal gradient for convection where present.

In particular, step 8 of the exemplary process the heat flow Q at location (x,y) on the sea floor can be found from the measured temperature gradients and the calculated disturbance due to downward propagation of heat as a result of long term bottom water temperature changes. Referring to FIG. 15, if there is no significant advection the quantity Tg(z), which is defined as the difference between the observed temperature T(z) at depth z and the component thereof Tw(z) due to downward heat flow should vary linearly with depth z, as curve A does in FIG. 15. If there is significant upward fluid flow in the vicinity of the measurement site, the relationship would be as illustrated by curve B in FIG. 15—all values would be substantially on the upper side of a straight line connecting the top and bottom temperatures (equilibrium) measured with the lance at a given site. Conversely, if there is a significant downward fluid flow in the vicinity of the measurement site, the relationship would be as illustrated by curve C in FIG.

15—all values would be substantially below the same straight line.

If a computer analysis of Tg(z) versus z at a given measurement site shows no or little advection, the heat flow Q(x,y) for that site can be found in accordance with the following expression, the parameters of which have been defined above:

$$q = K[T(z) - Tw(2)]/z = K[Tg(z)]/z \quad (6)$$

If the analysis detects significant advection, then the heat flow at the measurement site of interest is found, in accordance with the invention, in a manner which accounts for the disturbances due to advective heat flow. The one-dimensional advection relationship can be expressed as:

$$Tg(z) = T_0 + (T_b - T_0) \frac{e^{\beta z/L} - 1}{e^\beta - 1} \quad (7)$$

where Tg(z) is the temperature at depth z corrected for Tw(z), $T_0$ is the top temperature measurement, $T_b$ is the bottom temperature measurement, again corrected for Tw(z), and L is the lance length over which temperatures are measured. Beta is the Peclet number related as given below to the advection fluid velocity v, the density $\rho$ of the saturated medium around the measurement site, the heat capacity c of the same saturated medium, the length L over which measurements are taken at the site and the thermal conductivity K of the same saturated medium:

$$\beta = v\rho cL/K \quad (8)$$

Then the heat flow q(z) at any depth z can be expressed as:

$$q(z) = -k \frac{dTg}{dz}\bigg|_z + v\rho c Tg(z) \quad (9)$$

and from the above, the surface heat flow Q(x,y) at the site of interest with significant advection can be expressed as:

$$q(x,y) = v\rho c T_0 - \frac{T_1 - T_0}{e^\beta - 1} \quad (10)$$

The Peclet number beta can be determined for the purposes of the invention by an iterative process using least square differencing between observed and calculated temperatures at the observation points, e.g. using techniques of the kind discussed in Anderson, R. N., et al., Geothermal Convection Through Oceanic Crust and Sediments in the Indian Ocean, Science, 204, 828–832, 1979.

As a final note, it was earlier discussed, in connection with FIG. 15, that the manner in which the geothermal heat flow at a site varies with depth along the lance can be used as an indication of significant advection (if it deviates significantly from a linear function of depth). One convenient measure for this is the Durban-Watson statistic, used to determine (i) that the distribution of Tg(z) points on a Tg(z) v.z plot is random with respect to a straight line (e.g., the Durban-Watson statistic is less than about 0.3 or 0.4), to indicate lack of significant advection, or (ii) that the same statistic exceeds, e.g., about 0.3 or 0.4, to indicate the presence of significant advection, ad the desirability of correcting for its effect on surface heat flow.

At step 9 an area map of the surface heat flow Q(x,y) is produced from the results obtained in step 8. This area map can be in the form of heat flow isovalued curves, of the kind illustrated in FIG. 3, or in the form of a heat flow curve for a given section through the formation, as illustrated in FIG. 4, or can take other forms suitable for a particular purpose. It can be computer-drawn on a record medium such as paper or a CRT screen, or can be otherwise recorded in computer storage devices. The map or maps, in whatever format has been found suitable for the particular purpose, can be used as discussed in connection with the examples of FIGS. 2–11, or for other similar purposes.

For a particular end use it can be sufficient to stop the exemplary process at step 9, after the requisite surface heat flow map has been produced, and say, no heat flow hot spots are found. However, the invented process can be extended to the procedure of step 10, which involves producing a geological model in the area of the measurement sites, from knowledge derived from sources such as seismic or other surveys, matching the model with the heat flow map and correcting the map if necessary.

The surface geology can now be considered; specifically whether the surface is undergoing rapid sedimentation, or its opposite—rapid erosion.

The sedimentation correction can be evaluated as:

$$Q_s(x,y) = Q(x,y) \left\{ 1 - 4 i^2 \, \text{erfc}\left[\frac{v\sqrt{t}}{2\sqrt{k}}\right] \right\} \quad (11)$$

where

Qs(x,y) is the surface heat flow accounting for sedimentation, for point (x,y)

Q(x,y) is the heat flow found in step 9 of FIG. 12 v is the sedimentation rate as found, e.g., from core sample analysis t is the duration of the sedimentation as found, e.g., from core samples k is the sediment thermal diffusivity as found, e.g., from core samples $i^2$ erfc is the second integral of the complementary error function (see, e.g., Carslaw and Jaeger, Oxford University Press, 1959, p. 484)

In the alternative, more complicated sedimentation corrections can, of course, be made, as is discussed elsewhere in the literature in this field.

In addition, a variable surface topography can cause a disturbance to the geothermal gradient due to the fact that there is an increased surface area for heat to escape and that lateral heat flow can occur through inclined surfaces. The details of these corrections can be quite complicated. A presentation of such corrections is given by Lachenbruch, A. H., The Effect Of Two-Dimensional Topography On Superficial Thermal Gradients, U.S. Geological Survey Bulletin 1203-E, 86 pp., 1969.

As part of the exemplary invention, the subsurface structure from another geological information such as seismic profiling can now be considered (step 11 in FIG. 12). The surface heat flow map can be converted into temperatures at target traps of particular interest by constructing a detailed thermal conductivity function K versus depth d to the trap (K(d)). This is different from that in step 1 of FIG. 12 in that we now must determine K over several km of vertical section rather than over the few meters penetrated by the measurement lance. Compaction of sediments, changes in lithology, and seismic wave velocity increases with depth, can all be used to determine such a function, for example in the manner of Sclater, J. G. and Christie, P., J. Geophysical Research, 1980. The temperature (T(d)) t trap depth d is determined from:

$$T(d) = \frac{Qs(x,y)d}{K(d)} \quad (12)$$

The temperatures of a structure relative to surrounding rock at the same depth can then be compared. If a hydrocarbon maturation analysis is required, that temperature and the age of the trap can be used to calculate if oil or gas "maturation windows" have been exceeded within the trap, for example in the manner of Royden and Sclater, J. Geophysical Res., 1981.

Figure 16:
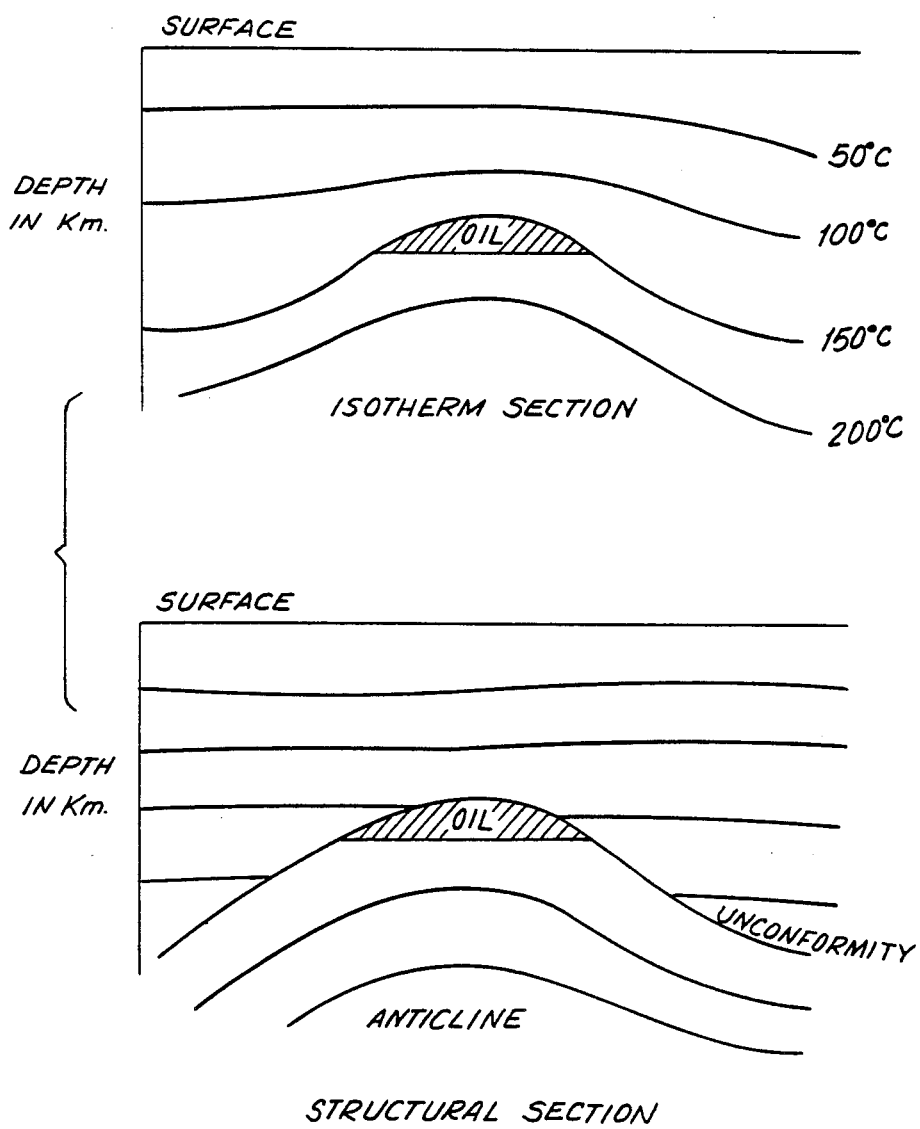
FIG. 16 illustrates a vertical section through a hypothetical formation (anticline) and the surface heat flow projected downwardly to form isotherm curves to find the reservoir temperature, as an aid to maturation analysis.

As one example, consider the hypothetical anticline structural section illustrated in FIG. 16, and the isotherm curves derived by projecting downwardly the surface heat flow map produced in accordance with the invention. If the structural map (together with the surface heat flow map) suggest oil at the illustrated trap, the heat contour at the trap (at 150° C.) can be used, together with aging information, to estimate whether this reservoir has matured properly enough to be commercially important.

Figure 17:
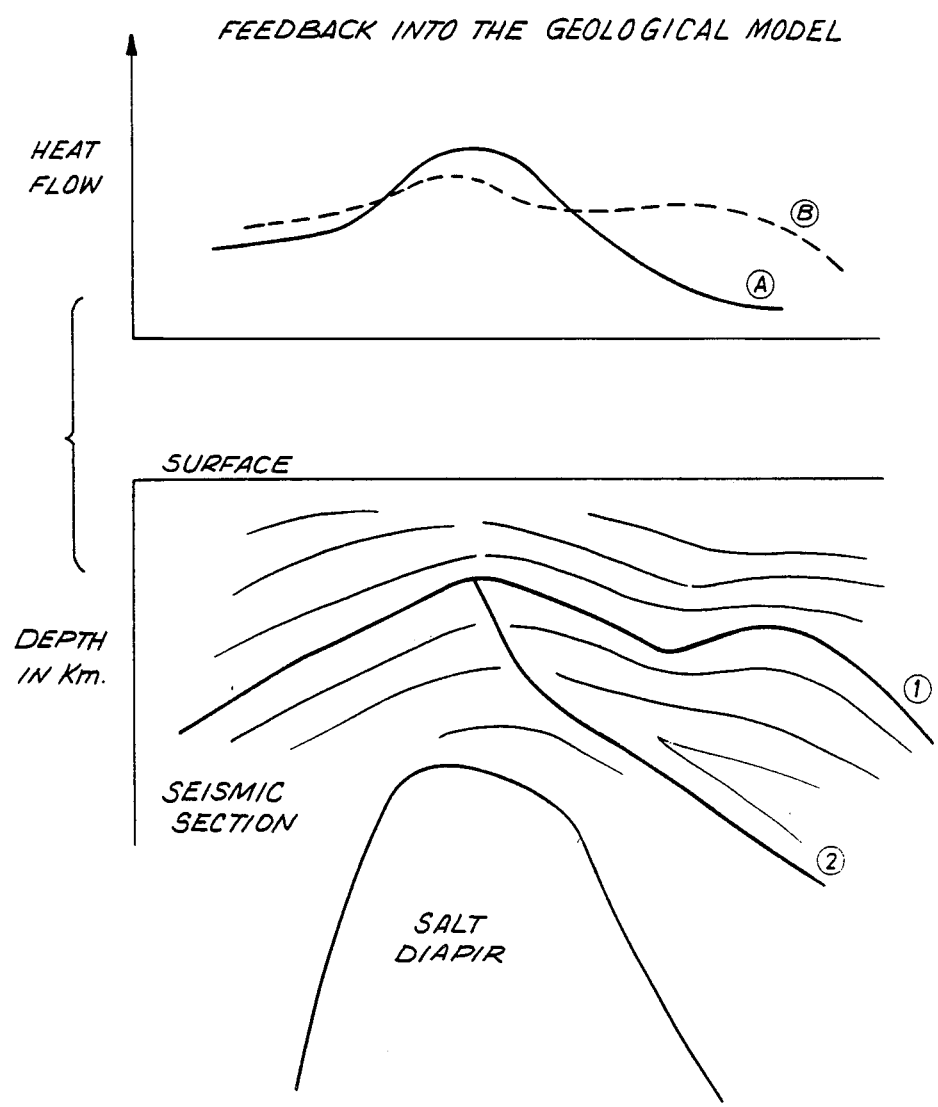
FIG. 17 illustrates the use of surface heat flow to adjust a geological model by confirming one of two possible options which have not been resolved from seismic profiling alone; i.e., which reflector (1 or 2) is top of oil trap.

In constructing the requisite geological model, the surface heat flow map derived in accordance with the invention can be used to refine the model until it matches the surface heat flow to a satisfactory degree. For example, consider FIG. 17, which illustrates a geological model in which it cannot be resolved from a seismic profile if the trapping layer has the general outline labelled (1) or that labelled (2). The surface heat flow can resolve this amgiguity: for example, if the surface heat flow conforms to the curve labelled (A), this would confirm option (2) and reject option (1) in the seismic section, and, conversely, if the surface heat flow is curve (B), this would confirm option (1) and reject option (2) in the seismic section.

Finally, step 12 of FIG. 12 is the decision, based upon the surface heat flow map corrected for the geological model and its downward continuation to temperatures of suspected traps of hydrocarbons at depth, of where to drill, or where to bid highly for blocks, or where to explore more fully with more expensive seismic prospecting techniques.

An Exemplary Multiplexed Thermistor Probe

While the exemplary process discussed in connection with FIG. 12 involved a sea floor environment, it should be clear that the invention applies in the same manner to other water environments such as river beds, lake beds, marshes, etc. It should also be clear that the invention similarly applies to land environments, the difference being that in land environments the downwardly propagating heat flow is not due to long term water temperature variations but rather long term changes in the ambient air, which can be measured in a manner similar to that used to measure long term temperature changes of the bottom water in sea environments.

Figure 18:
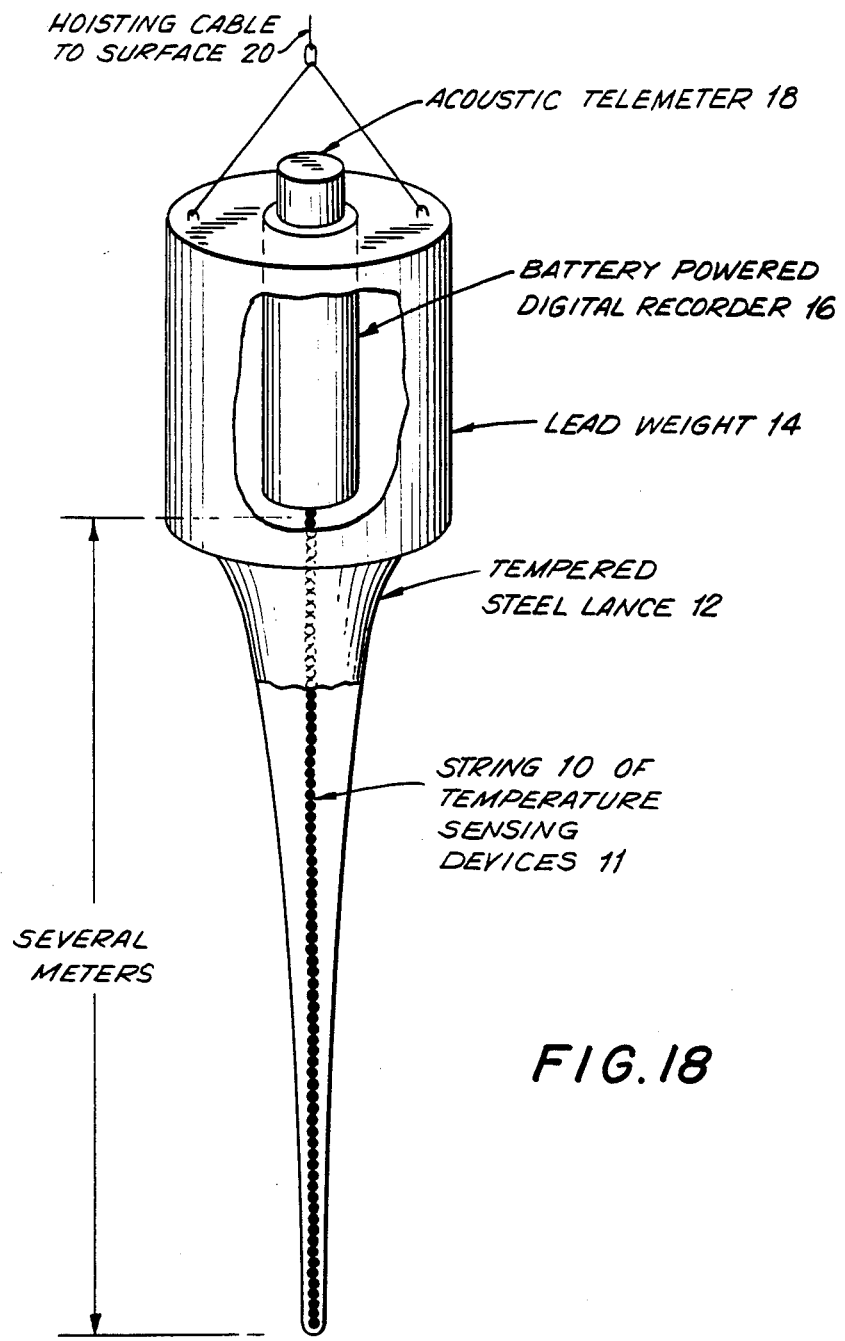
FIG. 18 is a partly perspective and partly cut-away view of a temperature probe for taking temperature measurements in accordance with an embodiment of the invention.

An exemplary lance suitable for use in practicing this invention is illustrated in FIG. 18 and comprises a string 10 of temperature sensing devices 11 closely spaced along the length of a lance 12 designed to be driven into the sea floor to a depth of several meters, a heavy weight 14 to help drive in the lance, recorder 16 (e.g., a battery powered digital recorder) to record the temperature measurements taken by each temperature sensing device 11 over a period of time, telemetry equipment, such as an acoustic telemeter 18 for transmitting temperature measurements to an exploration vessel, suitable electronic control circuitry (not shown in this figure) for controlling the recorder and telemeter to carry out the functions described herein, and a hoisting cable 20. While each of the temperature measuring devices 11 measures the temperature at a distinct respective point along the lance (and thus at a distinct depth into the sea floor for a given measurement site), the string of devices extends along the entire length of the lance, and the devices are so closely spaced (e.g., 25–100 devices per meter) that a substantially continuous temperature gradient can be measured. The measurements are multiplexed up the lance to recorder 16, where all are recorded, and at least some are acoustically telemetered (e.g. at 12 kHz) to the exploration vessel.

The lance can take different forms, and indeed different lances can be used in different measurement conditions. For example, an outrigger string of temperature sensors held away from the lance for intimate contact with the surrounding formation can be desirable for fast thermal response (e.g., 1–5 min. per site); however, such a probe is best for soft sediments or mud but may not be able to penetrate hard formations. In another lance, the temperature sensors can be imbedded in a superhard lance material which can be driven into and penetrate materials such as hard sands; however, such a probe requires longer time per measurement site, such as 15 to 30 minutes.

One option is to use a string of known temperature measuring devices, preferably multiplexed such that only one is being interrogated at any one time and only one set of wires goes down the entire lance. However, because the overall results produced in accordance with the invention improve with higher accuracy of the temperature measurements, and because minute temperature differences are often important (the entire temperature gradient over the several meters of the lance may be within the range of 1° C.), an important aspect of the invention is the discovery of a new way to measure small temperature differences between different sensors accurately and conveniently over a wide range of temperatures. Another important feature of this aspect of the invention is the discovery of a new way to make the outputs of the temperature measuring devices linear with temperature changes, and yet another is the discovery of a particularly efficacious way of multiplexing the temperature sensors.

It is known that thermistors exhibit great sensitivity to temperature and therefore can be used to measure small temperature changes. It has also been known, however, that the resistance of a thermistor changes with temperature non-linearly, in dependence on a "material constant" beta which changes with temperature in a way for which an exact equation has not been discovered. See, e.g., Allen, J., NTC Thermistor Microprocessor, Measurements and Control, April 1978; Chakravarty, R. K., et al., Linearization of Thermistor Resistance-Temperature Characteristics Using Active Circuitry, Rev. Sci. Instrum., Vol. 48, No. 12, December 1977, pp. 1645-1649; Allen, J., A Resistance-To-Voltage Converter Circuit Gives Thermistors High Linearity And High Sensitivity, Electronic Engineering Times, Nov. 27, 1978, p. 18; and Trietley, H., Practical Design Techniques Tame Thermistor Nonlinearities, EDN, Jan. 20, 1983, pp. 93-96. As noted in the first Allen publication, an early expression characterizing thermistor behavior is the so-called "beta" formula which incorporated a material constant beta:

$$\ln R(2) = \beta[1/T(2) - 1/T] + \ln R \quad (13)$$

where T is expressed in degrees Kelvin, R(2) is the thermistor resistance at T(2), and R is the resistance at T. Because the "material constant" beta cannot be described exactly over a temperature range, a table is normally given with commercial thermistors which, for each of a number of actual temperature points, gives the actual resistance and the calculated temperature corresponding thereto.

Various proposals have been made to compensate for this limitation of thermistors, as exemplified by the publications cited in the preceding paragraph. Nevertheless, it is believed that much need still remains for a temperature sensing arrangement which can provide highly accurate measurements of small temperature differences as between different thermistor sensors (or highly accurate absolute temperature measurements for a particular sensor) over a wide temperature range, for an output from such an arrangement which would vary linearly with temperature, and for other desirable characteristics in such an arrangement, such as compact size, simplicity, etc.

An important aspect of the invention, therefore, relates to a discovery leading to such improved way of making temperature measurements. Briefly, it has been discovered that the resistances of a thermistor at two different temperatures, or the resistances of two different thermistors at different temperatures, can be related to the respective temperatures accurately and linearly through an unexpectedly effective change in the old version of the "beta" relationship, and that the newly discovered relationship between thermistor resistance and temperature can be exploited particularly advantageously. As one example, it has been discovered that the following relationship unexpectedly holds accurately over a wide temperature range:

$$T(1) - T(0) = a \frac{[T(1) + t][T(0) + t]}{K'} \ln [R(1)/R(0)] \quad (14)$$

where T1 is the temperature of one thermistor sensor, T0 is a reference temperature (e.g., 273.15° Kelvin) or the temperature of a second thermistor sensor, K' is a proportionality constant, and a is the scale factor chosen for the particular application in mind. R1 and R0 are the thermistor resistances at temperatures T1 and T0 respectively and t is a temperature offset.

By using this small temperature offset t in relationship (14), the linearity of that relationship is dramatically improved over a temperature range wide enough to be useful for practical thermometry, as compared with the corresponding "linearity" of the "beta" formula (13).

When t=0, expression (14) reduces to a form of the original "beta" equation. When the value of K' is computed for specific temperature intervals (e.g., T1−T0=10° C.) using this relationship, K' will be seen to vary from one interval to the next. The numerical value of "t" is chosen such that the proportionality constant K' remains nearly constant over the temperature range of interest.

In the case of Dale/Western curve 1 thermistors, it has been found that the value of K' determined for ten degree intervals is nearly constant when t=40. In addition, the nature of this thermistor curve is such that when t=40, a substantially linear response is generated for temperature intervals over the entire commercial temperature range (0°-70° C.) when T0 is held constant at 0° C.

In order to determine T1 (if T0 is fixed or known), or T1−T0, it is necessary that the sensing elements generate a signal which uniquely specifies the ratio of R1 to R0. Previous thermometers using the "beta equation" have relied on an operational amplifier to force the voltage across the thermistor and a reference resistor to be equal, and the log of the ratio of the resulting currents has been used in computing the temperature. In such prior art arrangement, the ratio of the currents is just the inverse of the ratio of the resistances of these components.

In the case of the invention, an additional factor is brought into play by the unique way in which data from the sensor(s) is transmitted to the signal conditioning circuitry in the recorder.

Figures 19, 19A:
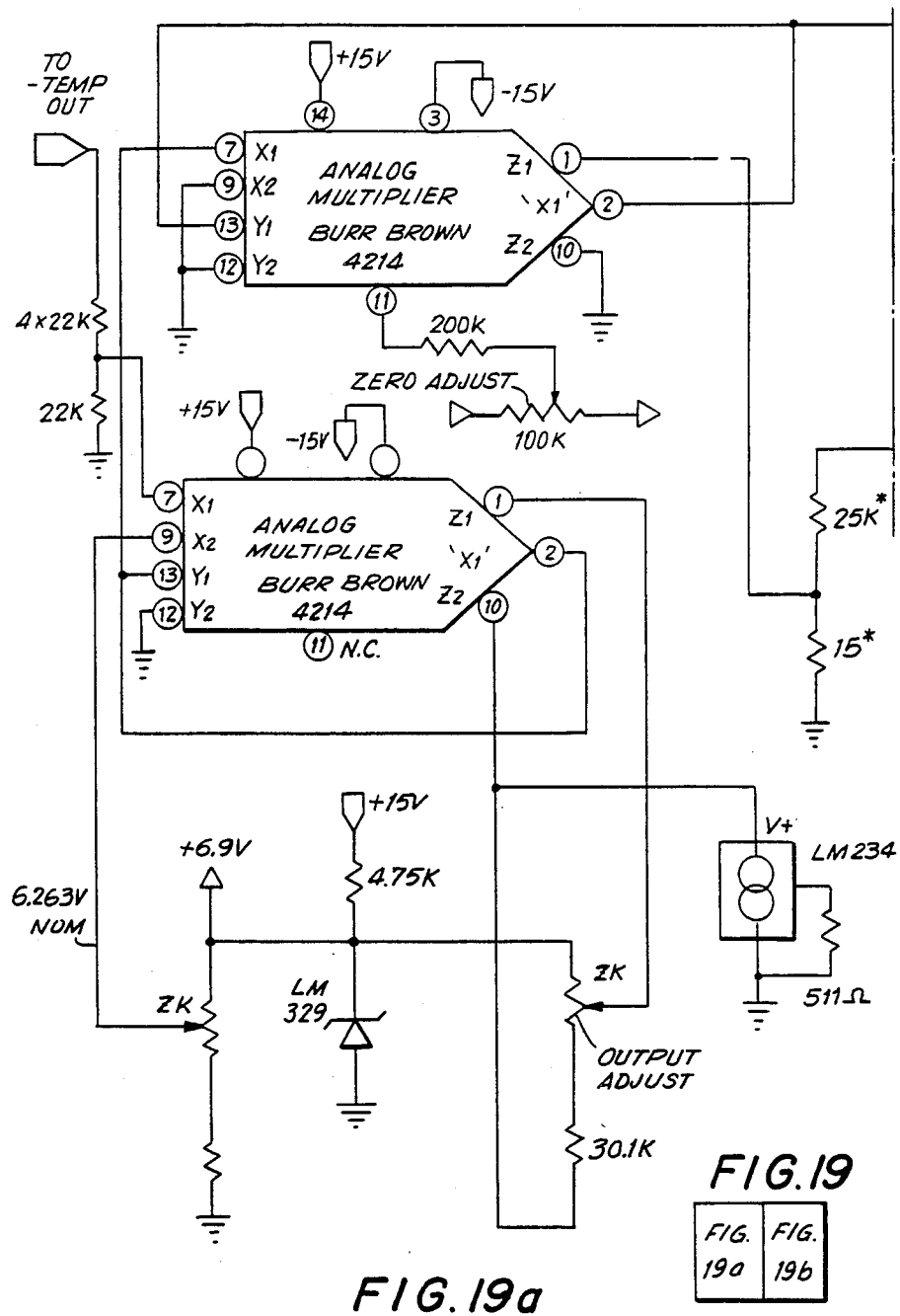
FIGS. 19a and 19b, which fit together as shown in FIG. 19, illustrate a linear temperature measuring circuit employing certain aspects of the invention.
Figure 19B:
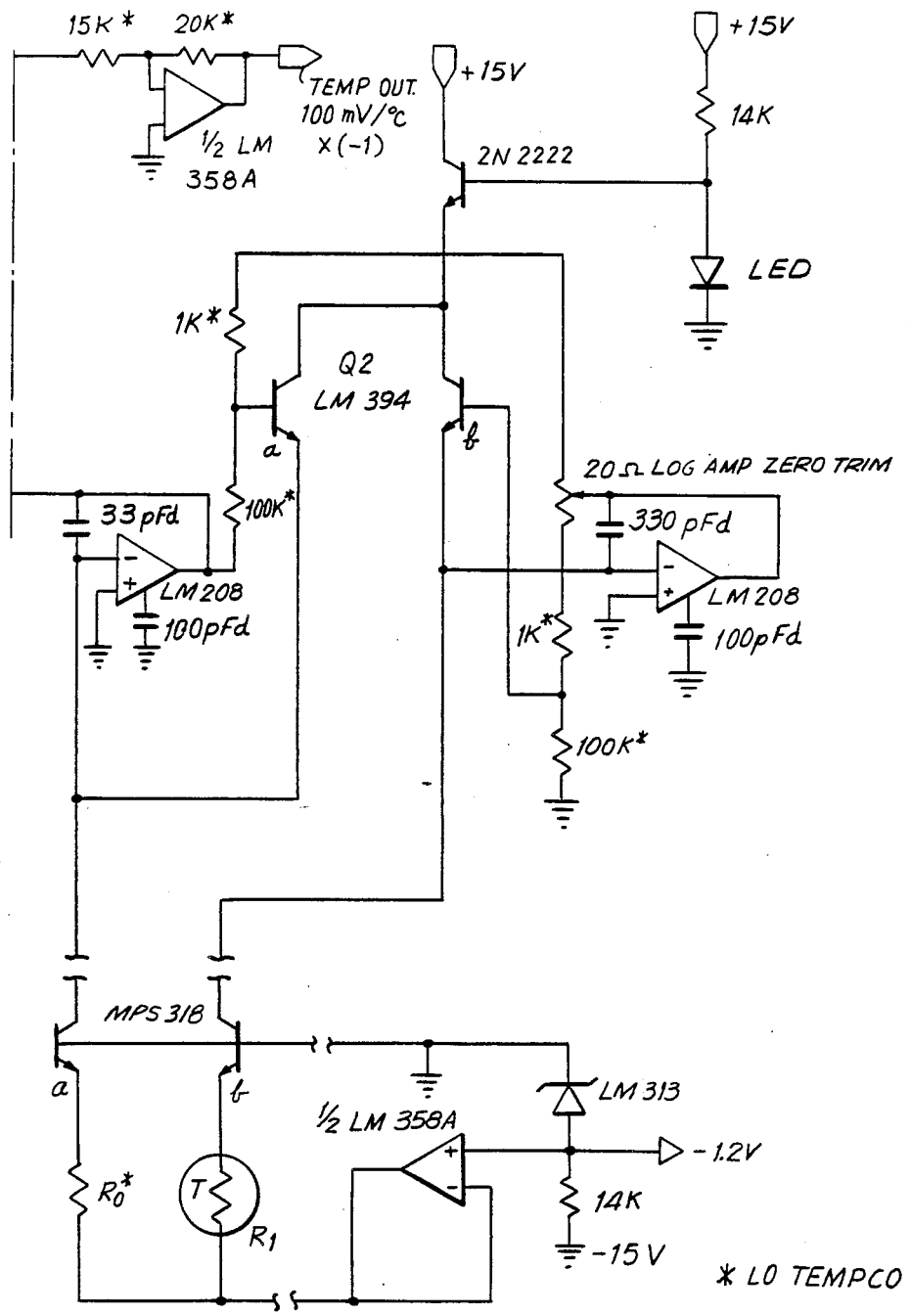

Referring to FIGS. 19a and 19b, which fit as shown in FIG. 19, and illustrate some of the principles of this aspect of the invention, each thermistor T is allied with a dual transistor current source. When a reading from a particular thermistor T is desired, the bases of the corresponding transistor Q1 are brought to the band gap reference voltage of silicon, $V_{g0} \approx 1.2$ volts. This results in a dual current source the outputs of which are proportional to the absolute temperature (PTAT) of the dual transistor.

The change in resistance due to temperature of the thermistor will have both a direct and an indirect effect on the thermistor current. As the temperature of the thermistor departs from the reference temperature T0, the change in current also modulates the base-emitter voltage of $Q_{1B}$. Note that during the manufacture of the probe sensors, R0 is trimmed such that I0 equals I1 at T0. The voltage E1 across the thermistor will differ from the voltage E0 across the reference resistor R0 by an amount equal to $\Delta V_{BE}$, where $\Delta V_{BE} = V_{BEa} - V_{BEb}$. For clarity, we will assume that transistors a and b are perfectly matched; then I0=E0/R0, I1=E1/R1=$(E0 - \Delta V_{BE})$/R1 and $$\frac{I1}{I0} = \left[1 - \frac{\Delta V_{BE}}{E0}\right] \frac{R0}{R1} \quad (15)$$

Because I0 is proportional to absolute temperature, we may assume likewise that E0 is also PTAT. $\Delta V_{BE}$ will also be proportional to absolute temperature. The ratio of currents I1/I0 generated by the dual current source will therefore be substantially independent of temperature.

Because $V_{BE}$ is also proportional to ln (I1/I0), I1/I0 closely approximates a power relationship to R0/R1; viz.

$$\left[\frac{I1}{I0}\right]^P = \frac{R0}{R1} \qquad (16)$$

Worked out numerically, P changes about 0.4% over a two-decade change in resistance ratio. The actual value of P will depend on the emitter saturation current ($I_{ES}$) of the dual transistor Q1 used, but that number will be close to 1.04. Taking the log of both sides yields ln (R0/R1)=1.04 ln (I1/I0) or ln (R1/R0)=1.04 ln (I0/I1). Relationship (14) may now be rewritten:

$$T1 - T0 = 1.04a \frac{(T1 + t)(T0 + t)}{K'} \ln \frac{I0}{I1} \qquad (17)$$

In designing a practical thermometer for use with Dale/Western curve 1 thermistors, the following relationship of this form proved useful:

$$T1 - T0 = a \frac{(T1 + 40)(313.15)}{123.69} \times .0568 \log_{10}(R1/R0) \qquad (18)$$

where $0.0568 \log_{10}(R1/R0)$ represents the voltage output of a temperature compensated log ratio amplifier ($\Delta V_{BE}$) out of which I0 and I1 are made to flow, and $K' = 123.69$ is the proportionality constant. Table I below shows the outputs of such a hypothetical thermometer:

TABLE No I
TABLE OF TEMPERATURE OUTPUTS
for Hypothetical Thermometer based on Eqn. (18)

| Temp. °C. | .0568 X $\log_{10}(R_1/R_0)$ | Thermometer Output |
|---|---|---|
| −20 | .0268830 | −19.952 |
| −10 | .0130085 | −9.984 |
| 0 | 0 | 0 |
| 10 | −.0122213 | 9.999 |
| 20 | −.0237114 | 19.999 |
| 30 | −.0345224 | 29.992 |
| 40 | −.0447365 | 39.998 |
| 50 | −.0543844 | 50.001 |
| 60 | −.0635118 | 60.001 |
| 70 | −.0721775 | 70.015 |
| 80 | −.0803735 | 80.000 |
| 90 | −.0881497 | 89.972 |
| 100 | −.0955386 | 99.932 |
| 110 | −.1025675 | 109.881 |
| 120 | −.1092616 | 119.819 |

The principal advantage of using a relationship of this form in building a thermometer is that the temperature output is substantially directly proportional to the output of the logarithmic amplifier. All the intervening terms serve merely to linearize the equation. There are no large offsets (such as 273.15) to subtract out.

The results of implementing relationship (18) by way of the prototype thermometer illustrated in FIGS. 19a and 19b appear in Table II below:

TABLE No II
VOLTAGE OUTPUTS OF CONSTRUCTED THERMOMETER

| Temp. °C. | $R_t$ | Thermometer Output | Temp. °C. | $R_t$ | Thermometer Output |
|---|---|---|---|---|---|
| −20 | 97.12 | −20.016 | 16 | 15.00 | 16.002 |
| −19 | 91.66 | −19.015 | 17 | 14.32 | 17.008 |
| −18 | 86.54 | −18.014 | 18 | 13.68 | 18.004 |
| −17 | 81.72 | −17.010 | 19 | 13.07 | 19.004 |
| −16 | 77.22 | −16.011 | 20 | 12.49 | 20.006 |
| −15 | 72.98 | −15.009 | 21 | 11.94 | 21.006 |
| −14 | 69.00 | −14.007 | 22 | 11.42 | 22.000 |
| −13 | 65.26 | −13.006 | 23 | 10.92 | 23.004 |
| −12 | 61.76 | −12.008 | 24 | 10.45 | 23.999 |
| −11 | 58.46 | −11.008 | 25 | 10.00 | 25.000 |
| −10 | 55.34 | −10.003 | 26 | 9.574 | 25.994 |
| −9 | 52.42 | −9.004 | 27 | 9.166 | 26.995 |
| −8 | 49.66 | −8.000 | 28 | 8.778 | 27.996 |
| −7 | 47.08 | −7.003 | 29 | 8.408 | 28.998 |
| −6 | 44.64 | −6.002 | 30 | 8.058 | 29.993 |
| −5 | 42.34 | −5.002 | 31 | 7.722 | 30.996 |
| −4 | 40.16 | −3.995 | 32 | 7.404 | 31.991 |
| −3 | 38.12 | −2.997 | 33 | 7.098 | 32.997 |
| −2 | 36.20 | −2.000 | 34 | 6.808 | 33.996 |
| −1 | 34.38 | −1.000 | 35 | 6.532 | 34.992 |
| 0 | 32.66 | 0.002 | 36 | 6.268 | 35.993 |
| 1 | 31.04 | 1.002 | 37 | 6.016 | 36.993 |
| 2 | 29.50 | 2.008 | 38 | 5.776 | 37.992 |
| 3 | 28.06 | 3.002 | 39 | 5.546 | 38.995 |
| 4 | 26.68 | 4.012 | 40 | 5.326 | 39.998 |
| 5 | 25.40 | 5.002 | 41 | 5.118 | 40.992 |
| 6 | 24.18 | 6.000 | 42 | 4.918 | 41.994 |
| 7 | 23.02 | 7.001 | 43 | 4.726 | 42.998 |
| 8 | 21.92 | 8.006 | 44 | 4.544 | 43.996 |
| 9 | 20.88 | 9.009 | 45 | 4.368 | 45.006 |
| 10 | 19.90 | 10.008 | 46 | 4.202 | 46.002 |
| 11 | 18.97 | 11.008 | 47 | 4.042 | 47.005 |
| 12 | 18.09 | 12.006 | 48 | 3.888 | 48.014 |
| 13 | 17.26 | 13.000 | 49 | 3.742 | 49.014 |
| 14 | 16.46 | 14.008 | 50 | 3.602 | 50.017 |
| 15 | 15.71 | 15.006 | 51 | 3.468 | 51.020 |

Notes:
$R_t$ in K-ohms; voltage output negative for T > 0° C.

Using the one-degree resistance-temperature conversion table R(t)/R(25), the appropriate resistance values were switched into the circuit. With the exception of one reading which proved consistently high at 4° C., all the readings between −10° and 40° C. fall within 0.01° of the expected value despite considerable truncation errors at certain temperatures due to the four-place cut-off of the tables.

The reading at 0° C. was checked several times during these measurements and it was always within 2 m° C. of zero. When the thermometer was left on, it showed some drift (±5 m ° C.) as measured by a Kiethley model 191 digital multimeter. This, however, can be accommodated by adding a conventional auto-zero feature if a thermometer of this type were to be used for making measurements at the 0.01 degree level. This auto-zero feature can rely on a digital approach using techniques know to those skilled in the art, and therefore not described in detail here.

Over a limited portion of the analog multiplier's output range, it was possible to compensate for non-linearities in the transconductance multipliers by adjusting the magnitude of the positive feedback which establishes the value of (T1+t) in multiplier X2. However, only about half of multiplier X1's output range could be utilized. These functions can be digitized, in a manner known to those skilled in the art, to increase these ranges.

Referring to the schematic of this circuit shown in FIGS. 19a and 19b, multiplier 2 computes the reciprocal of the number by which the log output must be multiplied in order to get the temperature. The numerator, which represents K/313.15 or about 3.95 volts, is derived from an LM 234 current source, the output of which is itself proportional to the absolute temperature of the device. This temperature dependence compensates for the temperature coefficient of the logging transistor, Q2, an LM 394 "supermatched pair." The $\Delta V_{BE}$ of Q2 is multiplied by a factor of 100 by LM208 operational amplifiers.

This output is applied to the Z inputs of multiplier X1, which is also configured in the "divide" mode. This creates a current imbalance in the multiplier which is impressed internally on two matched resistors. The operational amplifier which constitutes the output stage of the multiplier changes in such a way as to restore a balanced condition by creating an equal and opposite imbalance, which is proportional to the product of the voltages on the x and y inputs. The output amplifier (half of an LM358A) scales the output of multiplier X1 to correspond to 100 mV per °C. Part of this output signal (which has also changed sign) is fed back to the X1 input of multiplier X2 so that (X1-X2) corresponds to 2(T1+t).

Using relationship (17), it is also possible to realize a differential thermometer. Such a differential measurement is particularly well suited to making the high resolution measurements necessary to characterize hydrocarbon deposits.

Consider two dual transistor temperature sensors at temperatures T1 and T2 respectively. For a differential measurement, both sensors would be in the "active" mode; i.e., the bases of the dual transistors would be at $V_{g0}$ or approximately 1.2 volts. The outputs of the two sensors must, of course, be available on separate lines.

The "signal" from the sensors consists of a reference current (the current through $R^0(1)$ and $R_0(2)$) and the thermistor current (the current through $R_t1$ and $R_t2$). To repeat, the temperature of the thermistor can be determined from an accurate measurement of the ratio of these currents.

Using two matched dual transistors configured as a Gilbert multipliere core, it is possible to change the magnitude of these currents without changing their ratio. It is therefore possible to construct a circuit which forces the reference currents from the temperature sensors at T1 and T2 to be equal while maintaining the integrity of the temperature data. Having set I0'(T1) equal to I0'(T2), the measurement becomes independent of the temperature of the two dual sensor transistors. The differential temperature $\Delta T = T1 - T2$ is now proportional to the logarithm of the ratio of the two new thermistor currents $I_t'(R_t1)/I_t'(R_t2)$.

If one were to attempt to measure the logarithm in the usual way, such as with a logging transistor, the signal to noise ratio would be unacceptable. However, the output of a Wheatstone bridge shows remarkable fidelity to the desired output and the signal to noise ratio is not degraded.

If a Wheatstone bridge consisting of two matched thermistors and two equal resistors is driven at a voltage proportional to a (T1+t)(T2+t)/K', the output of the bridge will be proportional to the temperature difference of the thermistors.

The equivalent of this circuit is realized if thermistor currents I1'(T1) and I1'(T2) are impressed on two equal-valued precision resistors. The total voltage thus developed is made equal to $1.04a(T1+t)(T2+t)/K°$. A very high gain amplifier measures the difference in voltage impressed on the two resistors.

T1+t and T2+t must again be determined independently, but this can be accomplished by two logarithmic amplifiers. The following substitutions are made in the relationship:

$$V_b = \frac{(T_1 + t)(T_2 + t)}{K} = \quad (19)$$

$$\frac{K}{(3.95 + 10 \text{ LOG}_{out1})(3.95 + 10 \text{ LOG}_{out2})}$$

or $$V_b = \frac{4K}{(7.9 + 20 \text{ LOG}_{out1})(7.9 + 20 \text{ LOG}_{out2})}$$

where LOGout 1 and 2 again represent the amplified voltage output of the log ratio amplifier. Multiplying by 4/4 leads to a more optimum operating point for the analog multiplier.

In the deep ocean, it would be possible to use a version of such a two-sensor thermometer. A "master thermistor" in the stable bottom water can be used as a temperature reference against which all the sensors in the mud could be compared.

In shallow water, however, this would lead to excessive fluctuations in the apparent temperatures of the sensors. Therefore, in shallow water the current ratios coming from the multiplexed sensors are compared to a master current ratio generated in the instrument and saved. This master ratio is determined at the beginning of each measurement cycle, and is made to remain stable while all of the sensor probes (including the sensor used to determine the master ratio in the first place) are switched sequentially into the circuit.

Self-heating of the thermistors can offset the accuracy of thermistor measurements made on the millidegree level. In the application for which the invention is intended, a small amount of self-heating can be tolerated since all of the sensors are to be exposed to a similar medium. In addition, the thermal contact between a stainless steel lance housing and saturated sediments can be particularly acceptable. Because stainless steel is not a particularly good conductor of heat, the interaction between adjacent temperature sensors is minimized.

Figure 20B:
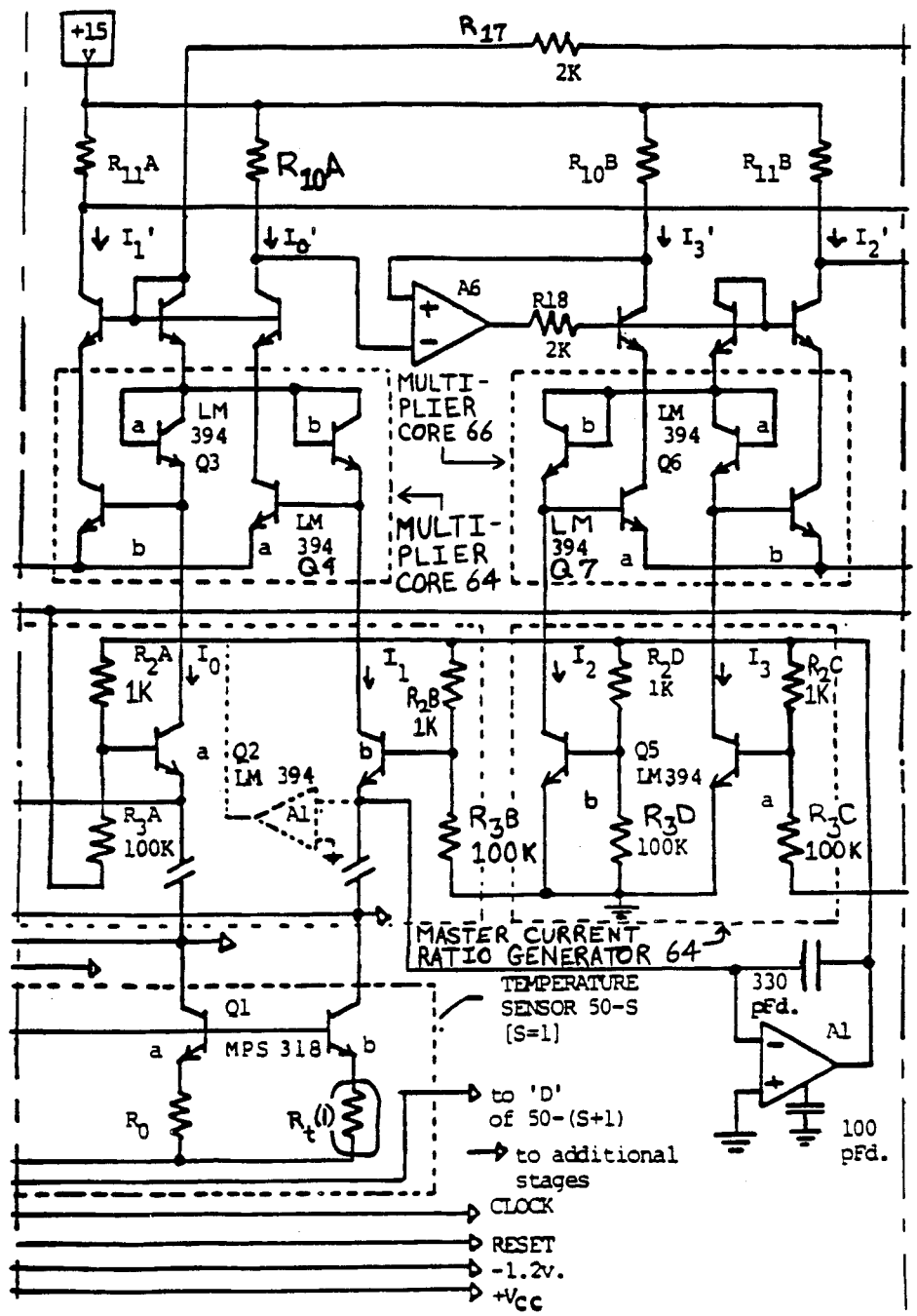
Figure 20C:
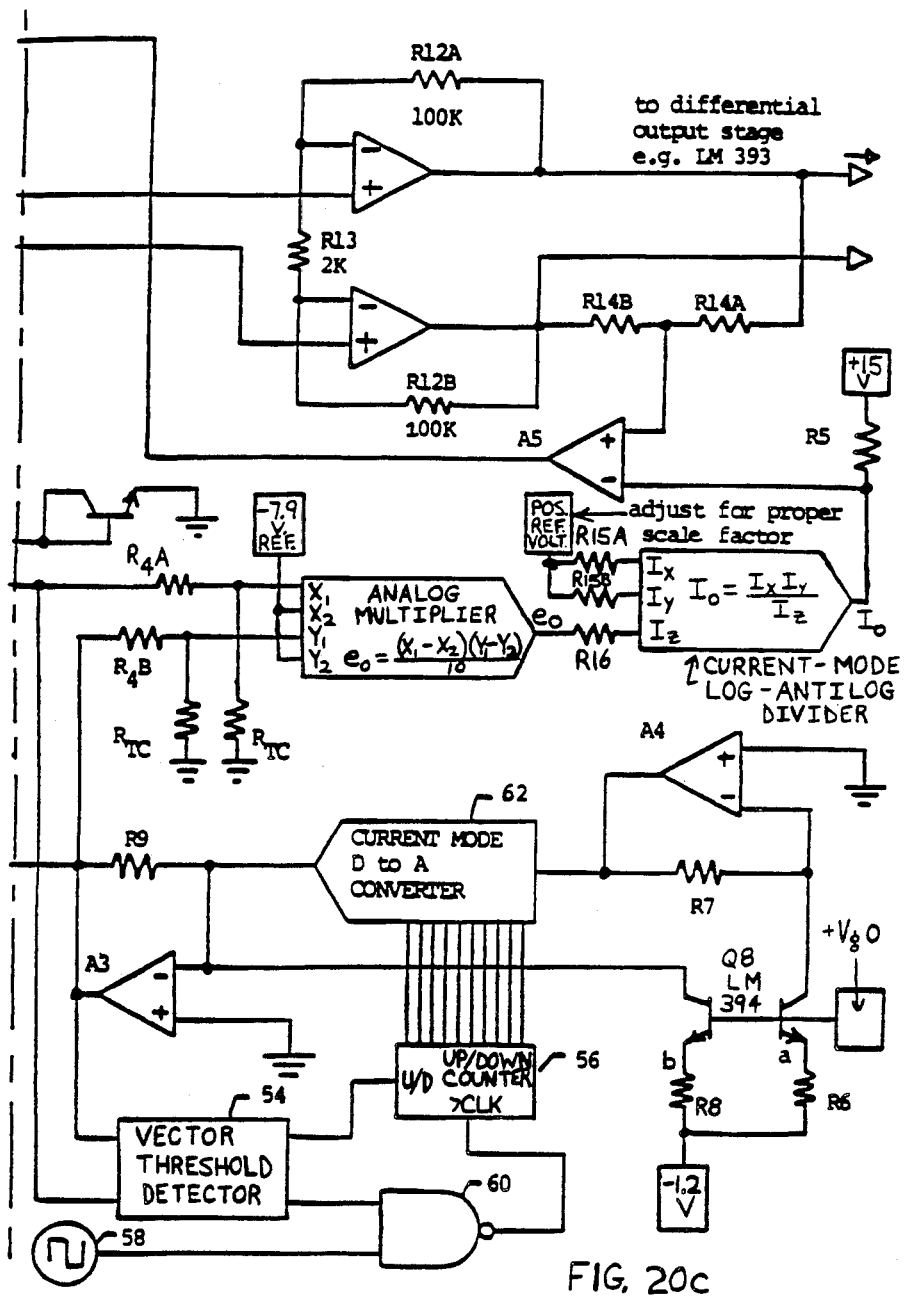

An exemplary and nonlimiting circuit embodying these aspects of the invention for a multisensor lance is illustrated in FIGS. 20a-20c, which fit together as shown in FIG. 20, and includes a multiplexed sequence of temperature sensors 50-1 through 50-N, one of which is illustrated in detail at 50-1, and comprises a thermistor RT, a reference resistor R$\phi$, a matched pair of transistors Q1 and a switch S. Switch S is shown, for simplicity, as a single pole, double throw element, but in fact can be a transistor current switch, to allow for rapid multiplexing such that only a selected one of units 50-1 through 50-N is connected at any one time to the illustrated precision-regulated power supply which is at about +1.2 V., while all others are connected to about −1.2 V. Switches S are operated for that purpose by a multiplex control 51 shown only schematically, R$\phi$ is trimmed during manufacture of the sensor to a value which causes the currents which flow through the thermistor and the reference resistor to be identical when the thermistor is at the reference temperature (e.g., 0° C.). This accommodates any inherent differences between the two transistors Q1.

The currents which pass through the thermistor and the reference resistors are designated I1 (corresponding to $I_t$ above) and I$\phi$ respectively, and pass through dual transistor Q(2), which is configured in the indicated manner as a log ratio amplifier 52. Operational amplifier A1 maintains the emitter of Q(2B) at ground potential. The ratio of resistance R2 to resistance R3 is such that the output of amplifier A2, which maintains the emitter of transistor Q(2A) at ground potential, is an amplified version of the base-to-emitter voltage of transistors Q(2A) and Q(2B). Thus the output of amplifier A2 would be negative when the temperature of the thermistor is less than the reference temperature (0° C.) because the reference current I0 would be less than the thermistor current I1.

Because R2 in the log ratio amplifier is chosen to be small, the voltage on the base of transistor Q(5B), a part of a master current ratio generator 64, will be held at a potential very close to the base voltage of transistor Q(2B). A collector current I2 will then flow which is very nearly identical to the collector current I1 of transistor Q(2B). The indicated circuitry associated with operational amplifier A3 modulates the voltage at the base of transistor Q(5A) such that a current I3 is generated which is in the same manner very nearly the same as the collector current I0 of transistor Q(2A). This circuitry associated with operational amplifier A3 for this purpose includes a vector threshold detector 54, which is a comparator with some small dead band built in so as to avoid hunting, and serves the purpose of adjusting the output of operational amplifier A3 if it determines that a closer approximation to I0 and I1 can be found. More particularly, detector 54 has one input from the output of A2 and another from the output of A3 and, depending on which is higher (and exceeds the dead band threshold), causes counter 56 to count up or down clock pulses from a source 58 passing through a gate 60. The count in counter 56 is supplied to a current mode digital-to-analog converter 62 whose output drives operational amplifier A3, to accomplish the goal of having current I3 as nearly close to current I0 as possible.

Currents I2 and I3 constitute the master current ratio. By forcing the master ratio to duplicate as closely as possible the ratio of currents coming from a designated probe sensor, such as 50-1, there is a one-to-one correspondence between the master current ratio and the temperature of the designated sensor. Because the outputs of all of the probe sensors will be compared to the ratio of I2 to I3, it will be necessary to know what that temperature is.

One of the most straightforward ways of determining the reference temperature for data analysis is to record the digital input to the digital-to-analog converter 62. This number represents a temperature-compensated version of the output of amplifier A3, which is proportional to the logarithm of the ratio of I2 to I3. From this information, the reference temperature (for that particular measurement cycle) can be readily calculated.

Using additional circuitry, not shown, the dual current source Q5 can be programmed in such a way that the current ratios thus produced correspond to discrete intervals of temperature (such as 0.1° C.). One of the new digital-to-analog converters with an on-board programmable read-only memory can be used for this application.

The same circuitry responsible for the temperature compensation of the digital input to digital-to-analog converter 62 also makes the current outputs of Q5 (I2 and I3) independent of temperature fluctuations in the instrument. The reference voltage supplied to the converter (the output of A4) is derived from the current output of transistor Q8A which is connected in the same manner as the reference current transistor Q1A(N) in the sensor probe. Its output is likewise proportional to the absolute temperature of the transistor. If transistor Q8 is at the same temperature as Q5, then the magnitude of I2 and I3 will be stable with temperature. Q8 and Q5 therefore should be mounted in good thermal contact with each other. Since the output of A2 is likewise dependent on temperature, Q2 should also be mounted on the same heat sink. Because the currents through Q2 and Q5 track each other, the optimum position for Q8 will be in the middle of the heat sink, between Q2 and Q5. Q8B provides a small offset (also proportional to temperature) which enables the instrument to respond to temperatures below 0° C. (e.g., −10° C., or −20° C.). Sufficient time must be allotted at the beginning of each measurement cycle to allow the master ratio to stabilize. This is particularly true when the lance first penetrates the sediment, at which time many of the sensors may undergo relatively large temperature excursions due to frictional heating. After the heat pulse dissipates, however, it can actually be better to increase the dead band of the threshold detector (54) so that the master ratio can remain stable during the remaining cycles in the mud.

A simpler form of temperature compensation can be used in the computation of (T1+t) and T2+t). $R_{TC}$ in the schematic is a resistor-thermistor composite with a negative temperature coefficient of −3500 parts per million at 25° C. The thermistor should be mounted on the same heat sink as Q2 and Q5. Resistor R4 is chosen so that the inputs to the analog multiplier are scaled to be equal to twenty times the millivolt output ($\Delta V_{BE}$) of transistors Q2 and Q5 at room temperature. R16 converts the voltage output of the multiplier to a current which is utilized by the current-mode divider to compute (T1+1) (T2+t)/K, designated $V_b$ in equation (19). A voltage proportional to $V_b/2$ is developed across R5.

In the schematic, only one dual transistor temperature sensor is shown in detail at 50-1. In practice, the collectors of all transistors generating reference currents I0(N) will be connected together and all collectors of transistors generating thermistor currents likewise. Only one sensor at a time is turned "on", the bases of that transistor at $V_{g0}$. The bases of the remaining transistors are held at −1.2 volts and contribute only very small leakage currents (which can be subtracted out if need be) to the sensor lines.

An optimum band gap reference voltage can be determined experimentally for the particular transistor type (e.g., MPS-318) used in the probe. See Akira Ohte and Michiaki Yamagata, "A Precision Silicon Transistor Thermometer," IEEE Transactions on Instrumentation and Measurement, Vol. IM-26, No. 4, December 1977, p. 335ff.

Having determined the master current ratio and latched the output register of counter 56, it remains only to scale the outputs of transistors Q1(N) and Q5 and amplify the voltage output developed thereby. Transistor pairs Q3 and Q4, and Q6 and Q7 are configured as Gilbert multiplier cores 64 and 66, respectively. The remaining transistors in the vicinity of the multiplier cores serve merely to clamp the collector-base voltage of the active devices or to shift the operating point of the circuit so that certain collector-base voltages do not become negative. In order to indicate the phase reversal inherent in such multiplier cores, transistor Q4A is shown connected to $Q_3b$ and $Q_4b$ to $Q_3a$. Corresponding connections are made for Q6 and Q7. Operational amplifiers A5 and A6 work in concert to produce the desired result. As the outputs of these amplifiers go positive, the magnitude of the currents produced in the corresponding multiplier cores increases. The ratio of the output currents is programmed by the ratio of the input currents; viz., $I0/I1 = I0'/I1'$ and $I3/I3 = I3'/I2'$.

Derived thermistor currents $I1'$ and $I2'$ flow through resistors $R_{11}A$ and $R_{11}B$ respectively. The primary function of dual operational amplifier A7 A and B is to amplify the small differential voltage corresponding to a differential temperature between the sensor and the master ratio reference temperature. The common-mode gain of such a cross-coupled differential amplifier is unity; in this circuit the so-called common-mode output ($V_{CM}$) is equal to the numerical average of the two voltages present on resistors $R_{11}A$ and $R_{11}B$. Operational amplifier A5 makes this voltage equal to the divider output $V_b/2$. At the same time, amplifier A6 modulates the output of multiplier core Q6-Q7 in such a way that the voltages developed by the two reference currents $I_0'$ and $I_3'$ are equal; i.e. $V_0 = I_0'R_{10}A = V-3 = I_3'R_{10}B$.

Thus, the total voltage impressed on resistors $R_{11}A$ and $R_{11}B$ is equal to $[aV_b]$ and the output voltage developed by amplifiers A7A and A7B will be proportional to the differential temperature (and equal to twice the output of a similarly configured Wheatstone bridge). In most applications, the differential output will then go to a differential to single ended amplifier (such as National Semiconductor's LM 393) which will provide additional gain (e.g., 10 or 100), or to the differential inputs of a suitable analog-to-digital converter followed by a digital display and/or digital recorder.

The thermistor circuits 50-1 through 50-N can be embedded in the shaft of lance 12 (FIG. 18), as temperature sensing device 10, in a manner allowing good thermal contact with the ambient, with wires for power supplies, multiplex control and currents I0 and I1 running along the length of the lance, and the remaining circuitry being at the top of the lance complex, such as in the same housing as digital recorder 16 (together with an A/D converter and known control circuitry, not shown, to convert the respective thermistor temperature measurements from the FIG. 20c circuit into digital data for recordal at 16 and selective telemetering to the surface as earlier discussed).

What we claim is:

1. A method of exploring the sea floor for subsurface hydrocarbons comprising the steps of:
    selecting measurement sites arrayed along the sea floor in a pattern selected as a function of available geological information;
    measuring substantially continuous temperature gradients at a plurality of depths within several meters into the sea floor at each of said sites by taking temperature readings at each of said sites, correcting said temperature readings for transient disturbances by ascertaining the temperature at each site at the same depth for a period of time and extrapolating from the temperatures so ascertained corresponding equilibrium temperatures which would be measured if taken after an infinitely long time in an unchanging environment and from said extrapolated equilibrium temperatures determining said temperature gradients;
    determining the contribution to said temperature gradients caused by heat propagation through said sea floor resulting from long term bottom water temperature variations; and differentiating any fluid advection contribution in the measured actual values of temperature when adjusted for the contributions due to said long term buttom water temperature variations at the respctive measurement sites;
    calculating the surface heat flow at each site from the corresponding temperature gradient at said site while, eliminating the long term bottom water and fluid advection contributions determined at said site; and
    producing a map of said surface heat flow, said map being indicative of characteristics of subsurface hydrocarbon convection through nearby subsurface formations and thereby the location of said subsurface hydrocarbons.

2. A method as in claim 1 in which said transient disturbances include frictional heat due to positioning of temperature measuring devices into the sea floor and characteristics of heat propagation from surrounding formations to said temperature measuring devices.

3. A method as in claim 1 in which the measuring step comprises, for each site, driving a temperature measuring lance into the sea bottom, determining whether the lance has been driven in to a sufficient depth, whether the lance has produced invalid temperature data and whether the site selection is consistent with available knowledge of the subsurface geology and lithology, and revising the measuring step as needed in accordance with the last recited determination.

4. A method as in claim 3 in which the measuring step including, for each site, verifying and revising as needed the selection of the next site in accordance with the last recited determination.

5. A method as in claim 1 in which the step of determining the contribution to said gradients due to heat propagation resulting from long term water temperature variations includes finding said contribution, for each measurement site, as a function of coefficients of a Fourier series representation of the long term bottom water temperature variations, thermal diffusivity of subsurface formations at the site, and phase shift for component waves of the Fourier series.

6. A method as in claim 1 in which the step of calculating heat flow at the respective sites and eliminating said fluid advection contribution comprises finding, for each site, a geothermal gradient by removing from the measured gradient the contribution due to heat propagation resulting from long term bottom water temperature variations, determining if the geothermal gradient varies substantially linearly with depth into the sea floor and, if not, correcting it for effects of significant fluid advection through the sea floor at the site.

7. A method as in claim 6 in which said correction for fluid advection at the site is made as a function of top and bottom temperatures which have been measured at the site and have been corrected for long term bottom water temperature variations, Peclet number, density of saturated medium around the site and heat capacity of said medium.

8. A method as in claim 1 including the steps of producing a geological model of subsurface formations in the vicinity of the measurement sites and adjusting the model as needed to achieve a substantial agreement thereof with the surface heat flow map.

9. A model as in claim 8 in which the step of adjusting the geological model includes taking into account effect, on the surface heat flow at each site, of sedimentation at the site.

10. A method as in claim 9 in which said accounting for sedimentation is as a function of an estimated sedimentation rate and duration of the sedimentation and thermal diffusivity of the sediment.

11. A method as in claim 10 including projecting the surface heat flow map downwardly to find temperature characteristics of a subsurface hydrocarbon trap.

12. A method as in claim 1 in which the step of measuring the temperature gradients comprises taking temperature readings using thermistor temperature sensors which are in a circuit establishing a substantially linear relationship between the log of the ratio of the resistances of a thermistor at two different temperatures and the difference between said temperatures over an expected operating temperature range.

13. A method as in claim 1 in which said measuring step includes taking temperature readings using temperature measuring sensors arrayed at a density of at least 25 per meter along a lance which has a length of several meters long, driving said lance into the sea floor, to a depth of several meters, at each measurement site and leaving said lance therein for a time period long enough to measure said temperature gradient, before being moved to the next site.

14. A method as in claim 13 in which outputs of said temperature measuring sensors are multiplexed up the lance over a set of conductors shared by all sensors, and the multiplexed outputs are recorded by apparatus coupled with the lance from site to site.

15. A method as in claim 13 in which said temperature measuring sensors comprise thermistors connected in an electrical circuit which provides electrical outputs which vary substantially linearly with temperature changes of the thermistors over temperature windows that are several decades of °C. wide and include the typical range of ambient temperatures to which the sensors are likely to be exposed in said step of measuring temperature gradients.

16. A method of making geothermal measurements comprising establishing thermal contact between a thermistor and a geological formation whose temperature is to be measured and relating, through a circuit arrangement, (i) the log of the ratio of the resistance of the thermistor at a first temperature to the resistance at a second temperature and (ii) a difference between said temperatures, in a manner allowing said relating to remain substantially linear throughout a temperature range of several decades of °C. of expected temperatures and said circuit implementing a product of (i) said first temperature plus an offset, and (ii) said second temperature plus an offset, wherein said offset is selected, for a given thermistor or set of thermistors, to be at a level satisfying said linearity.

17. A method of making geothermal measurements which comprises establishing thermal contact between at least two thermistors and a geological formation whose temperature is to be measured and relating, through a circuit arrangement, (i) the log of the ratio of resistance of a first thermistor at a first temperature to its resistance at a second temperature and (ii) the log of the ratio of the resistance of a second thermistor at a third temperature to its resistance at the second temperature, in a manner allowing said relationship to remain substantially linear throughout a temperature range of several decades of °C. of expected temperatures said circuit implementing a product of (i) said first temperature plus an offset, and (ii) said second temperature plus an offset, wherein said offset is selected, for a given thermistor or set of thermistors, to be at a level satisfying said linearity.

18. A method of determining at a geological surface level strata heat flow emanating through the strata from below surface geothermal sources comprising:
measuring a substantially continuous temperature gradient in the strata at a site from the surface at a plurality of depths within several meters below the surface by taking temperature readings at said site, correcting said temperature readings for transient disturbances by ascertaining the temperature at the same depth for a period of time and extrapolating from the temperatures so ascertained corresponding equilibrium temperatures which would be measured if taken after an infinitely long time in an unchanging environment and from said extrapolated equilibrium temperatures determining said temperature gradient;
determining the contribution to said temperature gradient at said site in the strata from the surface to the depth of said several meters caused by above-surface heat propagation through said strata; and differentiating any fluid advection contribution in the measured actual values of temperature when adjusted for the contribution due to above-surface heat propagation; and
calculating heat flow from said temperature gradient, while eliminating said above-surface heat propagation and fluid advection contributions during said heat flow calculation.

19. A method as in claim 1 in which the step of measuring the temperature gradients comprises taking temperature readings using thermistor temperature sensors which are in a circuit establishing a substantially linear relationship between the log of the ratio of the resistance of one thermistor which is at one of said temperatures and of another thermistor which is at another of said temperatures and the difference between said temperatures over an expected operating temperature range.

* * * * *